United States Patent
Zang

(10) Patent No.: US 9,164,506 B1
(45) Date of Patent: Oct. 20, 2015

(54) SYSTEMS AND METHODS FOR TARGET TRACKING

(71) Applicant: SZ DJI TECHNOLOGY Co., Ltd, Shenzhen (CN)

(72) Inventor: Bo Zang, Shenzhen (CN)

(73) Assignee: SZ DJI TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 14/471,954

(22) Filed: Aug. 28, 2014

Related U.S. Application Data

(63) Continuation of application No. PCT/CN2014/083315, filed on Jul. 30, 2014.

(51) Int. Cl.
*G05D 1/12* (2006.01)
*G05D 1/00* (2006.01)

(52) U.S. Cl.
CPC ............ *G05D 1/0038* (2013.01); *G05D 1/0094* (2013.01); *G05D 1/12* (2013.01)

(58) Field of Classification Search
CPC ................. G05D 1/0094; G05D 1/12
USPC ........ 701/2, 11; 348/113, 114, 144, 169, 170, 348/171, 172, 211.99
See application file for complete search history.

(56) References Cited

U.S. PATENT DOCUMENTS

| | | | |
|---|---|---|---|
| 7,970,507 B2 * | 6/2011 | Fregene et al. .................. 701/23 |
| 2008/0054158 A1 * | 3/2008 | Ariyur et al. ................ 250/203.1 |
| 2009/0157233 A1 * | 6/2009 | Kokkeby et al. ................... 701/3 |
| 2009/0187299 A1 * | 7/2009 | Fregene et al. .................. 701/23 |
| 2010/0004802 A1 | 1/2010 | Bodin et al. |
| 2010/0250022 A1 * | 9/2010 | Hines et al. ........................ 701/2 |
| 2011/0141287 A1 * | 6/2011 | Dunkel et al. ................. 348/169 |
| 2011/0304737 A1 * | 12/2011 | Evans et al. .................... 348/169 |
| 2012/0143808 A1 * | 6/2012 | Karins et al. ..................... 706/46 |
| 2012/0154579 A1 * | 6/2012 | Hampapur et al. ........... 348/143 |
| 2012/0200703 A1 | 8/2012 | Nadir et al. |
| 2012/0287274 A1 * | 11/2012 | Bevirt ............................ 348/144 |
| 2012/0307042 A1 * | 12/2012 | Lee et al. ....................... 348/114 |

(Continued)

FOREIGN PATENT DOCUMENTS

| | | |
|---|---|---|
| CN | 102809969 A | 12/2012 |
| CN | 103149939 A | 6/2013 |
| WO | WO 2010/089738 A2 | 8/2010 |

OTHER PUBLICATIONS

Rafi, et al. Autonomous target following by unmanned aerial vehicles. In Proceedings of the SPIE, May 2006.

(Continued)

*Primary Examiner* — Thomas G Black
*Assistant Examiner* — Peter D Nolan
(74) *Attorney, Agent, or Firm* — Wilson Sonsini Goodrich & Rosati

(57) ABSTRACT

The present invention provides systems, methods, and devices related to target tracking by UAVs. The UAV may be configured to receive target information from a control terminal related to a target to be tracked by an imaging device coupled to the UAV. The target information may be used by the UAV to automatically track the target so as to maintain predetermined position and/or size of the target within one or more images captured by the imaging device. The control terminal may be configured to display images from the imaging device as well as allowing user input related to the target information.

30 Claims, 18 Drawing Sheets

(56) References Cited

U.S. PATENT DOCUMENTS

2013/0085643 A1* 4/2013 Mathews .................. 701/49
2013/0176423 A1* 7/2013 Rischmuller et al. ......... 348/114
2014/0049643 A1* 2/2014 Segerstrom et al. .......... 348/144

OTHER PUBLICATIONS

International search report and written opinion dated May 6, 2015 for PCT/CN2014/083315.

* cited by examiner

SYSTEMS AND METHODS FOR TARGET TRACKING

CROSS-REFERENCE

This application is a continuation application of International Application No. PCT/CN2014/083315, filed on Jul. 30, 2014, the content of which is hereby incorporated by reference in its entirety.

BACKGROUND OF THE INVENTION

Aerial vehicles such as unmanned aerial vehicles (UAVs) can be used for performing surveillance, reconnaissance, and exploration tasks for military and civilian applications. Such aerial vehicles may carry a payload configured to perform a specific function such as capturing images of surrounding environment.

In some instances, it may be desirable for aerial vehicles to track a specific target. For small-sized aerial vehicles, such tracking is traditionally achieved via control commands from a user-operated remote control terminal or device. Such manual tracking control may become difficult in certain circumstances, such as when the movable object or target is moving quickly or when the movable object is at least partially blocked from view of the user. Furthermore, the attention necessary for such manual tracking typically requires a dedicated user that controls a camera that onboard the aerial vehicle separate from a user that controls the navigation of the aerial vehicle, thereby increasing the cost for aerial photography and other applications of the aerial vehicles.

SUMMARY OF THE INVENTION

In some instances, it may be desirable for aerial vehicles to track a specific target. Thus, a need exists for improved UAV tracking methods and systems that provides automatic or semi-automatic tracking of a target, thereby relieving operators of the aerial vehicles of manually tracking the targets. The present invention provides systems, methods, and devices related to target tracking by UAVs. The UAV may be configured to receive target information from a control terminal related to a target to be tracked by an imaging device coupled to the UAV. The target information may be used by the UAV to automatically track the target so as to maintain predetermined position and/or size of the target within one or more images captured by the imaging device. Any description of tracking may include visual tracking by the imaging device. The control terminal may be configured to display images from the imaging device as well as allowing user input related to the target information.

According to an aspect of the present invention, a method for controlling an unmanned aerial vehicle (UAV) is provided. The method comprises: receiving, from a remote user, one or more navigation commands to move the UAV along a flight path; receiving, from the remote user, target information of a target to be tracked by an imaging device on the UAV; and tracking the target according to the target information by automatically adjusting at least one of the UAV or the imaging device while the UAV moves along the flight path according to the one or more navigation commands from the remote user.

According to another aspect of the present invention, an unmanned aerial vehicle (UAV) with tracking capabilities is provided. The UAV comprises: one or more receivers, individually or collectively, configured to receive from a remote user (1) one or more navigation commands to move the UAV along a flight path, and (2) target information of a target to be tracked by an imaging device on the UAV; and one or more processors, individually or collectively, configured to track the target according to the target information by automatically adjusting at least one of the UAV or the imaging device while the UAV moves along the flight path according to the one or more navigation commands from the remote user.

According to another aspect of the present invention, s system for controlling an unmanned aerial vehicle (UAV) is provided. The system comprises: one or more receivers, individually or collectively, configured to receive from a remote user (1) one or more navigation commands to move the UAV along a flight path, and (2) target information of a target to be tracked by an imaging device on the UAV; and one or more processors, individually or collectively, configured to track the target according to the target information by automatically adjusting at least one of the UAV or the imaging device while the UAV moves along the flight path according to the one or more navigation commands from the remote user.

In some embodiments, the imaging device includes a camera or a camcorder.

In some embodiments, the one or more navigation commands are adapted to control a speed, position or attitude or the UAV.

In some embodiments, the target is substantially stationary relative to a reference object.

In some embodiments, the target is moving relative to a reference object.

In some embodiments, the target information includes initial target information.

In some embodiments, the initial target information includes an initial position or an initial size of the target within an image captured by the imaging device.

In some embodiments, the target information includes target type information.

In some embodiments, tracking the target according to the target information further includes identifying, based on the target type information, the target to track from within one or more images captured by the imaging device using an image recognition algorithm.

In some embodiments, the target type information includes color, texture, or pattern information.

In some embodiments, the target information includes expected target information.

In some embodiments, the expected target information includes an expected position or an expected size of the target within an image captured by the imaging device.

In some embodiments, the expected size of the target is the same as an initial size of the target.

In some embodiments, the expected position of the target is the same as an initial position of the target.

In some embodiments, tracking the target according to the target information includes maintaining, within a predetermined degree of tolerance, the expected position, or the expected size of the target within one or more images captured by the imaging device.

In some embodiments, the imaging device is coupled to the UAV via a carrier configured to permit the imaging device to move relative to the UAV.

In some embodiments, the carrier is configured to permit the imaging device to rotate around at least two axes relative to the UAV.

In some embodiments, tracking the target according to the target information includes automatically adjusting at least one of the UAV, the carrier, or the imaging device while the UAV moves along the flight path according to the one or more navigation commands from the remote user.

In some embodiments, the target information includes expected target information and tracking the target according to the target information comprises: determining current target information of the target based on one or more images captured by the imaging device; detecting a deviation of the current target information from the expected target information; and calculating an adjustment to the UAV, the carrier, or the imaging device so as to substantially correct the deviation.

In some embodiments, the deviation is related to a change in position of the target and the calculated adjustment is related to an angular velocity for the UAV.

In some embodiments, the angular velocity is relative to a yaw axis of the UAV.

In some embodiments, the angular velocity is relative to a pitch axis of the UAV.

In some embodiments, the deviation is related to a change in position of the target and the calculated adjustment is related to an angular velocity for the imaging device relative to the UAV.

In some embodiments, the calculated adjustment is used to generate control signals for the carrier so as to cause the imaging device to move relative to the UAV.

In some embodiments, the deviation is related to a change in size of the target and the adjustment is related to a linear velocity for the UAV.

In some embodiments, the deviation is related to a change in size of the target and the adjustment is related to one or more parameters of the imaging device.

In some embodiments, the one or more parameters of the imaging device include focal length, zoom, or focus.

In some embodiments, the calculated adjustment is limited to a predetermined range.

In some embodiments, the predetermined range corresponds to a predetermined range of control lever amount of a control system.

In some embodiments, the control system includes a flight control system for the UAV or a control system for the carrier.

In some embodiments, a warning signal is provided if the calculated adjustment falls outside the predetermined range.

In some embodiments, tracking the target comprises comparing the calculated adjustment to a predetermined maximum threshold value and providing the predetermined maximum threshold value if the calculated adjustment exceeds the predetermined maximum threshold value.

In some embodiments, the predetermined maximum threshold value includes a maximum angular velocity or a maximum linear velocity for the UAV or the imaging device.

In some embodiments, tracking the target comprises comparing the calculated adjustment to a predetermined minimum threshold value and providing the predetermined minimum threshold value if the calculated adjustment is less than the predetermined minimum threshold value.

In some embodiments, the predetermined minimum threshold value includes a minimum angular velocity or a minimum linear velocity for the UAV or the imaging device.

In some embodiments, the target information is received from a remote control device accessible to the remote user.

In some embodiments, the one or more navigation commands are received from the same remote control device.

In some embodiments, the one or more navigation commands are received from a different remote control device.

In some embodiments, the remote control device is configured to receive user input from a touchscreen, joystick, keyboard, mouse, or stylus.

In some embodiments, the remote control device is configured to receive user input from a wearable device.

In some embodiments, the remote control device is configured to: receive one or more images captured by the imaging device from the UAV; display the one or more images; receive a user selection of a target from within a displayed image; generate the target information of the target based on the user selection of the target; and transmit the target information to the UAV.

In some embodiments, the remote control device is further configured to generate the one or more navigation commands based on user input and to transmit the one or more navigation commands to the UAV.

In some embodiments, the remote control device is further configured to receive tracking information related to the target and to display the one or more images with the tracking information.

According to an aspect of the present invention, an unmanned aerial vehicle (UAV) with tracking capabilities is provided. The UAV comprises: one or more receivers, individually or collectively, configured to receive, from a remote user, user-specified target information of a target to be tracked by an imaging device on the UAV, the user-specified target information including a predetermined position or a predetermined size of the target within an image captured by the imaging device, the imaging device coupled to the UAV via a carrier configured to permit the imaging device to move relative to the UAV; and one or more processors, individually or collectively, configured to: detect a deviation from the predetermined position or the predetermined size of the target based on one or more images captured by the imaging device; and generate commands to automatically adjust the UAV, the carrier, or the imaging device so as to substantially correct the detected deviation from the predetermined position or the predetermined size of the target.

According to another aspect of the present invention, a system for controlling an unmanned aerial vehicle (UAV) is provided. The system comprises: one or more receivers, individually or collectively, configured to receive, from a remote user, user-specified target information of a target to be tracked by an imaging device on the UAV, the user-specified target information including a predetermined position or a predetermined size of the target within an image captured by the imaging device, the imaging device coupled to the UAV via a carrier configured to permit the imaging device to move relative to the UAV; and one or more processors, individually or collectively, configured to: detect a deviation from the predetermined position or the predetermined size of the target based on one or more images captured by the imaging device; and generate commands to automatically adjust the UAV, the carrier, or the imaging device so as to substantially correct the detected deviation from the predetermined position or the predetermined size of the target.

According to another aspect of the present invention, a method for controlling an unmanned aerial vehicle (UAV) is provided. The method comprises: receiving, from a remote user, user-specified target information of a target to be tracked by an imaging device on the UAV, the user-specified target information including a predetermined position or predetermined size of the target within an image captured by the imaging device, the imaging device coupled to the UAV via a carrier configured to permit the imaging device to move relative to the UAV; detecting, by a processor onboard the UAV, a deviation from the predetermined position or the predetermined size of the target based on one or more images captured by the imaging device; and automatically adjusting the UAV, the carrier, or the imaging device so as to substantially correct the detected deviation from the predetermined position or the predetermined size of the target.

In some embodiments, the imaging device includes a camera or a camcorder.

In some embodiments, the method further comprises receiving, from the remote user, one or more commands adapted to control a speed, position, orientation or attitude or the UAV.

In some embodiments, the method further comprises receiving, from the remote user, one or more commands adapted to control a speed, position, orientation or attitude or the carrier.

In some embodiments, the method further comprises receiving, from the remote user, one or more commands adapted to control one or more operational parameters of the imaging device.

In some embodiments, the one or more operational parameters of the imaging device include focal length, zoom level, imaging mode, image resolution, focus, depth of field, exposure, lens speed, or field of view.

In some embodiments, the carrier is configured to permit the imaging device to rotate around at least one axes relative to the UAV.

In some embodiments, the carrier is configured to permit the imaging device to rotate around at least two axes relative to the UAV.

In some embodiments, the target information of the target further includes target type information.

In some embodiments, the target type information includes a color or texture of the target.

In some embodiments, the predetermined position of the target includes an initial position or an expected position of the target.

In some embodiments, the predetermined size of the target includes an initial size or an expected size of the target.

In some embodiments, detecting the deviation from the predetermined position or the predetermined size of the target comprises comparing a position or size of the target within the one or more images captured by the imaging device with the predetermined position or predetermined size, respectively.

In some embodiments, adjusting the UAV, the carrier, or the imaging device comprises calculating an adjustment to the UAV, the carrier, or the imaging device so as to substantially correct the deviation.

In some embodiments, the deviation is related to a change in position of the target and the adjustment is related to an angular velocity for the UAV.

In some embodiments, the angular velocity is relative to a yaw axis of the UAV.

In some embodiments, the angular velocity is relative to a pitch axis of the UAV.

In some embodiments, the deviation is related to a change in position of the target and the adjustment is related to an angular velocity for the imaging device relative to the UAV.

In some embodiments, the adjustment is used to generate control signals for the carrier so as to cause the imaging device to move relative to the UAV.

In some embodiments, the angular velocity is relative to a yaw axis of the imaging device.

In some embodiments, the angular velocity is relative to a pitch axis of the imaging device.

In some embodiments, the deviation is related to a change in size of the target and the adjustment is related to a linear velocity for the UAV.

In some embodiments, the deviation is related to a change in size of the target and the adjustment is related to one or more parameters of the imaging device.

In some embodiments, the one or more parameters of the imaging device include focal length, zoom level, imaging mode, image resolution, focus, depth of field, exposure, lens speed, or field of view.

In some embodiments, the calculated adjustment is limited to a predetermined range.

In some embodiments, the predetermined range corresponds to a predetermined range of control lever amount of a control system.

In some embodiments, the control system includes a navigation control system for the UAV or a control system for the carrier.

In some embodiments, the method further comprises providing a warning signal if the adjustment falls outside the predetermined range.

In some embodiments, the warning signal is used to provide an audio or visual signal.

In some embodiments, the warning signal is used to provide a kinetic signal.

In some embodiments, the method further comprises transmitting, in substantially real-time, images captured by the imaging device to a remote user device accessible to the remote user.

In some embodiments, the remote user device comprises a display for displaying the images captured by the imaging device.

In some embodiments, the remote user device comprises an input device for providing the target information.

In some embodiments, the input device includes a touchscreen, joystick, keyboard, mouse, or stylus.

In some embodiments, the input device includes a wearable device.

In some embodiments, the target information is provided based on the transmitted images.

In some embodiments, the method further comprises providing, in substantially real-time, tracking information of the target to the remote user device.

In some embodiments, the remote user device is configured to: receive a user selection of the target from within one or more images displayed on the remote user device; and generate the target information of the target based on the user selection of the target.

According to another aspect of the present invention, a method for controlling an unmanned aerial vehicle (UAV) is provided. The method comprises: displaying, via a display, one or more images captured by an imaging device coupled to the UAV in substantially real-time; receiving, via an input device, a user selection of a target from within at least one of the one or more images being displayed in substantially real-time; generating target information of the target based at least in part on the user selection of the target; and providing the target information to the UAV so as to allow the UAV autonomously track the target according to the target information.

According to another aspect of the present invention, a system for controlling an unmanned aerial vehicle (UAV) is provided. The system comprises: a display configured to display one or more images captured by an imaging device coupled to the UAV; an input device configured to receive a user selection of a target from within at least one of the one or more images being displayed on the display; one or more processors, individually or collectively, configured to generate target information of the target based at least in part on the user selection of the target; and a transmitter configured to provide the target information to the UAV so as to allow the UAV autonomously track the target according to the target information.

According to another aspect of the present invention, an apparatus for controlling an unmanned aerial vehicle (UAV) is provided. The apparatus comprises: a display configured to display one or more images captured by an imaging device coupled to the UAV; an input device configured to receive a user selection of a target from within at least one of the one or more images being displayed on the display; one or more processors, individually or collectively, configured to generate target information of the target based at least in part on the user selection of the target; and a transmitter configured to provide the target information to the UAV so as to allow the UAV autonomously track the target according to the target information.

In some embodiments, the target information includes initial target information.

In some embodiments, the initial target information includes an initial position or an initial size of the target within an image captured by the imaging device.

In some embodiments, the initial target information is generated based on the user selection of the target.

In some embodiments, the target information includes target type information.

In some embodiments, the target type information includes color, texture, or pattern information.

In some embodiments, the target type information is generated based on the user selection of the target.

In some embodiments, the target information includes expected target information.

In some embodiments, the expected target information is generated based on the user selection of the target.

In some embodiments, the expected target information includes an expected position or an expected size of the target within an image captured by the imaging device.

In some embodiments, the target information does not include expected target information.

In some embodiments, the input device includes a touchscreen, joystick, keyboard, mouse, stylus, or wearable device.

In some embodiments, the user selection of the target is achieved by a user selecting an area of the at least one of the one or more images being displayed on the display, the selected area corresponding to the target.

In some embodiments, the user selection of the target is achieved by a user directly touching an area of the at least one of the one or more images being displayed on the display, the touched area corresponding to the target.

In some embodiments, the user selects the area using a stylus, mouse, keyboard, or a wearable device.

In some embodiments, selecting the area includes touching, swiping, circling, or clicking in the area.

In some embodiments, the one or more processors, individually or collectively, are further configured to display, on the display, the selected target with a selection indicator in response to the user selection of the target, the selection indicator indicating that the target has been selected by the user.

In some embodiments, the one or more processors, individually or collectively, are further configured to receive tracking information related to the target and, based on the tracking information, display the selected target with a tracking indicator within one or more subsequent images captured by the imaging device, the tracking indicator indicating, in substantially real-time, that the target is being tracked by the UAV according to the target information.

According to another aspect of the present invention, a method for controlling an unmanned aerial vehicle (UAV) is provided. The method comprises: receiving, in substantially real-time, one or more images captured by an imaging device coupled to the UAV; receiving user-specified target information of a target including a predetermined position or a predetermined size of a target within an image from the one or more images; providing the user-specified target information to the UAV; and displaying the one or more images and a tracking indicator associated with the target within the one or more images, the tracking indicator indicating that the target is being tracked by the UAV in substantially real-time according to the user-specified target information.

According to another aspect of the present invention, an apparatus for controlling an unmanned aerial vehicle (UAV) is provided. The apparatus comprises: a receiver configured to receive, in substantially real-time, one or more images captured by an imaging device coupled to the UAV; an input device configured to receive user-specified target information of a target including a predetermined position or a predetermined size of a target within an image from the one or more images; a transmitter for provide the user-specified target information to the UAV; and a display configured to display the one or more images and a tracking indicator associated with the target within the one or more images, the tracking indicator indicating that the target is being tracked by the UAV in substantially real-time according to the user-specified target information.

According to another aspect of the present invention, a system for controlling an unmanned aerial vehicle (UAV) is provided. The system comprises: a receiver configured to receive, in substantially real-time, one or more images captured by an imaging device coupled to the UAV; an input device configured to receive user-specified target information of a target including a predetermined position or a predetermined size of a target within an image from the one or more images; a transmitter for provide the user-specified target information to the UAV; and a display configured to display the one or more images and a tracking indicator associated with the target within the one or more images, the tracking indicator indicating that the target is being tracked by the UAV in substantially real-time according to the user-specified target information.

In some embodiments, the input device is further configured to receive one or more commands adapted to control a speed, position, orientation or attitude or the UAV, or one or more operational parameters of the imaging device.

In some embodiments, the imaging device is coupled to the UAV via a carrier configured to permit the imaging device to rotate relative to the UAV along at least one axis and wherein the input device is further configured to receive one or more commands adapted to control a speed, position, orientation, or attitude of the carrier.

In some embodiments, the carrier is configured to permit the imaging device to rotate around at least two axes relative to the UAV.

In some embodiments, the target is tracked by the imaging device according to the target information via automatic adjustment to at least one of the UAV, the carrier, or the imaging device.

In some embodiments, a second input device is included and configured to receive one or more commands adapted to control a speed, position, orientation or attitude or the UAV, or one or more operational parameters of the imaging device.

In some embodiments, the imaging device is coupled to the UAV via a carrier configured to permit the imaging device to rotate relative to the UAV along at least one axis and wherein the system further comprise a second input device configured to receive one or more commands adapted to control a speed, position, orientation or attitude of the carrier.

In some embodiments, the one or more operational parameters of the imaging device include focal length, zoom level, imaging mode, image resolution, focus, depth of field, exposure, lens speed, or field of view.

In some embodiments, the target is tracked by the imaging device according to the target information via automatic adjustment to at least one of the UAV, the carrier, or the imaging device.

In some embodiments, the predetermined position includes an initial position of the target.

In some embodiments, the predetermined size includes an initial size of the target.

In some embodiments, the predetermined position includes an expected position of the target.

In some embodiments, the predetermined size includes an expected size of the target.

In some embodiments, the target information further includes target type information.

In some embodiments, the target information is generated based on a user selection of the target.

In some embodiments, the tracking indicator includes a geometric shape, a check mark, or an arrow.

In some embodiments, the geometric shape includes a circle, a rectangle, or a triangle.

In some embodiments, the target is tracked by the imaging device according to the target information via automatic adjustment to at least one of the UAV or the imaging device.

It shall be understood that different aspects of the invention can be appreciated individually, collectively, or in combination with each other. Various aspects of the invention described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
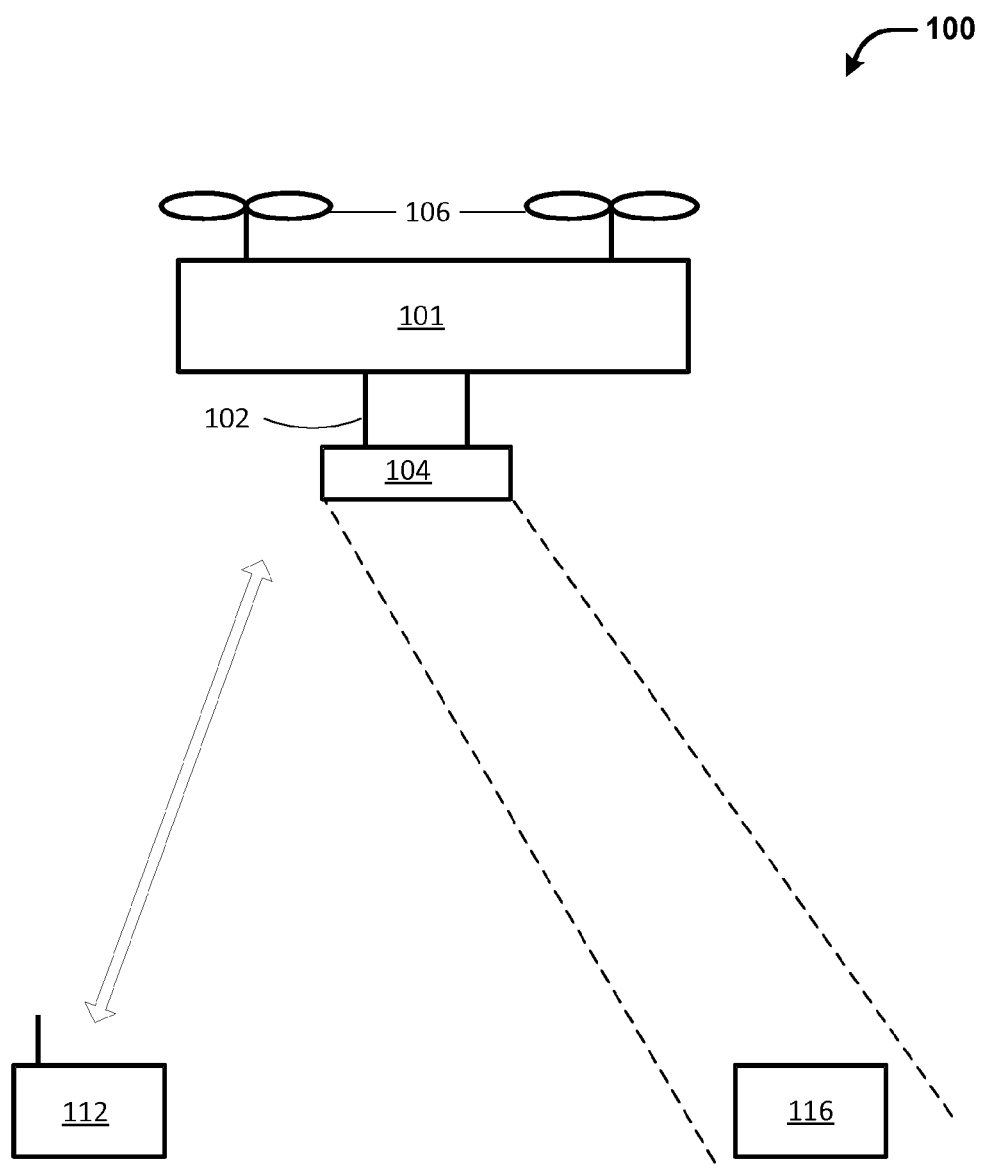
FIG. 1 illustrates an exemplary target tracking system, in accordance with embodiments.

The present invention provides systems, methods, and devices related to target tracking by unmanned aerial vehicles (UAVs). A UAV may be configured to receive target information from a control terminal related to a target to be tracked by an imaging device coupled to the UAV. The target information may be used by the UAV to automatically cause the imaging device to track the target so as to maintain predetermined position and/or size of the target within one or more images captured by the imaging device. The tracking of the target may be performed while the UAV is controlled to navigate according user commands and/or predetermined navigation paths. The control terminal may be configured to display images from the imaging device as well as allowing user input related to the target information.

Using the tracking methods and systems provided herein, a single user can control both the navigation of a UAV and tracking of a target substantially concurrently without the help of an extra person. The user can utilize a user interface of a control terminal to specify the target to track and/or the type of target to track. Such user-specified target information may be transmitted to the UAV, which can autonomously track the target, for example, using an imaging device onboard the UAV. Images captured by the imaging device (e.g., pictures and/or videos) can be transmitted in real time to the control terminal for display, playback, storage, or other purposes. The user may also change or adjust the target to track in real time using the control terminal. Advantageously, such autonomous tracking can be performed by the UAV while the user engages in other activities such as controlling the navigation of the UAV, or other activities.

For instance, a user can configure the UAV to track herself as she engages in a variety of activities such as hiking or biking. She may specify herself as the tracking target for the UAV using the user interface provided by the control terminal. For example, she may select herself as the target from an image displayed on a user interface of the control terminal, for example, using a touchscreen. Once the target information is transmitted to the UAV, the user can be relieved from the low-level operations associated with manual tracking of a target such as adjusting the UAV, carrier or imaging device. Instead, she can focus on other activities such as biking while the UAV automatically tracks in real time her based on the provided target information using the methods provided herein. For instance, the attitude, position, velocity, zoom, and other aspects of the UAV and/or the imaging device can be automatically adjusted to ensure that the user maintains a designated position and/or size within the images captured by the imaging device. Images captured during the tracking process (e.g., videos or pictures) may be streamed to the control terminal in real time or substantially real time for display, playback, storage, or other purposes. All of the above can be achieved by one person in a relatively painless manner, making it easier for users achieve previously difficult-to-achieve tasks.

Such tracking methods and systems as described herein advantageously facilitate the automation of the low-level control portion of the tracking process so as to reduce the efforts required and the errors resulting from manual tracking. At the same time, the tracking methods and system described herein still allows users to maintain, if desired, high-level control of the tracking process (e.g., by specifying the type of target to track).

FIG. 1 illustrates an exemplary target tracking system 100, in accordance with embodiments. The system 100 includes a movable object 101 and a control terminal 112. The system 100 may be used to track one or more targets 116. Although the movable object 101 is depicted as an unmanned aerial vehicle (UAV), this depiction is not intended to be limiting, and any suitable type of movable object can be used, as described herein. One of skill in the art would appreciate that any of the embodiments described herein in the context of aircraft systems can be applied to any suitable movable object.

In some embodiments, the movable object 101 can include a carrier 102 and a payload 104. The carrier 102 may permit the payload 104 to move relative to the movable object 101. For instance, the carrier 102 may permit the payload 104 to rotate around one, two, three, or more axes. Alternatively or additionally, the carrier 102 may permit the payload 104 to move linearly along one, two, three, or more axes. The axes for the rotational or translational movement may or may not be orthogonal to each other.

In some embodiments, the payload 104 may be rigidly coupled to or connected with the movable object 101 such that the payload 104 remains substantially stationary relative to the movable object 101. For example, the carrier 102 that connects the movable object 101 and the payload 104 may not permit the payload 104 to move relative to the movable object 101. Alternatively, the payload 104 may be coupled directly to the movable object 101 without requiring a carrier.

In some embodiments, the payload 104 can include one or more sensors for surveying or tracking one or more targets 116. Examples of such a payload may include an image capturing device or imaging device (e.g., camera or camcorder, infrared imaging device, ultraviolet imaging device, or the like), an audio capture device (e.g., a parabolic microphone), an infrared imaging device, or the like. Any suitable sensor(s) can be incorporated into the payload 104 to capture any visual, audio, electromagnetic, or any other desirable signals. The sensors can provide static sensing data (e.g., a photograph) or dynamic sensing data (e.g., a video). The sensors may capture sensing data continuously in real time or at high frequencies.

In various embodiments, the target 116 being tracked the movable object 101 can include any natural or man-made objects or structures such geographical landscapes (e.g., mountains, vegetation, valleys, lakes, or rivers), buildings, vehicles (e.g., aircrafts, ships, cars, trucks, buses, vans, or motorcycle). The target 116 can also include live subjects such as people or animals. The target 116 may be moving or stationary relative to any suitable reference frame. The reference frame can be a relatively fixed reference frame (e.g., the surrounding environment, or earth). Alternatively, the reference frame can be a moving reference frame (e.g., a moving vehicle). In various embodiments, the target 116 may include a passive target or an active target. An active target may be configured to transmit information about the target, such as the target's GPS location, to the movable object. Information may be transmitted to the movable object via wireless communication from a communication unit of the active target to a communication unit of the movable object. Examples of an active target can include a friendly vehicle, building, troop, or the like. A passive target is not configured to transmit information about the target. Examples of a passive target can include a neutral or hostile vehicle, building, troop, and the like.

The movable object 101 can be configured to receive, and the control terminal 112 can be configured to provide control data. The control data can be used to control, directly or indirectly, aspects of the movable object 101. In some embodiments, the control data can include navigation commands for controlling navigational parameters of the movable object such as the position, speed, orientation, or attitude of the movable object 101. The control data can be used to control flight of a UAV. The control data may affect operation of one or more propulsion units 106 that may affect the flight of the UAV. In other cases, the control data can include commands for controlling individual components of the movable object 101. For instance, the control data may include information for controlling the operations of the carrier 102. For example, the control data may be used to control an actuation mechanism of the carrier 102 so as to cause angular and/or linear movement of the payload 104 relative to the movable object 101. As another example, the control data may be used to control the movement of the carrier 102 without the payload. As another example, the control data may be used to adjust one or more operational parameters for the payload 104 such as taking still or moving pictures, zooming in or out, turning on or off, switching imaging modes, change image resolution, changing focus, changing depth of field, changing exposure time, changing speed of lens, changing viewing angle or field of view, or the like. In other embodiments, the control data may be used to control a sensing system (not show), communication system (not shown), and the like, of the movable object 101.

In some embodiments, the control data from the control terminal 112 can include target information. In some cases, the target information can include characteristics of a specific target such as an initial position (e.g., coordinates) and/or size of a target within one or more images captured by an imaging device carried by the movable object 101. Additionally or alternatively, the target information can include target type information such as characteristics of a type or category of targets including color, texture, pattern, size, shape, dimension, and the like. Target information can include data representation of an image of the target. This may include an image of the target in a field of view. Field of view may be defined or encompassed by the images captured by the imaging device.

Target information can also include expected target information. The expected target information specifies the characteristics that the target being tracked is expected to meet in the images captured by the imaging device. The expected target information may be used to adjust the movable object, carrier and/or imaging device so that the target being tracked maintains an appearance in one or more images according to the expected target information. For example, the target may be tracked so as to maintain an expected position and/or size within one or more images captured by the imaging device. For example, the expected position of the tracked target may be near the center of the image or off-center. The expected size of the tracked target may be around a certain number of pixels. The expected target information may or may not be the same as the initial target information. In various embodiments, expected target information may or may not be provided by the control terminal. For example, expected target information may be hardcoded in the control logic executed by a processing unit onboard the movable object, stored in a data store local and/or remote to the movable object, or obtained from other suitable sources.

In some embodiments, the target information (including specific target information and target type information) may be generated at least in part on user input at the control terminal 112. Additionally or alternatively, the target information may be generated based on data from other sources. For example, target type information may be derived based on previous images and/or data extracted from local or remote data stores. The images could have been previously captured by the imaging device 104 coupled to the movable object 101 or other devices. The images could be computer-generated. Such target type information may be selected by the user and/or provided automatically by default to the movable object.

The target information may be used by the movable object 101 to track one or more targets 116. The tracking and any other related data processing may be performed at least in part by one or more processors onboard the movable object 101. In some embodiments, the target information can be used to identify, by the movable object, the target 116 to be tracked. Such identification of the target may be performed based on the initial target information including the specific characteristics of a particular target (e.g., initial coordinates of the target within an image captured by the movable object), or general characteristics of a type of target (e.g., color and/or texture of the target(s) to be tracked). In some cases, target identification can involve any suitable image recognition and/or matching algorithms. In some embodiments, target identification includes comparing two or more images to determine, extract, and/or match features contained therein.

Once a target is identified, expected target information can be used to detect a deviation from expected characteristics of the target such as expected position and/or size. In some embodiments, current target characteristics or information can be determined based on one or more images captured by the movable object. The current target information can be compared with the expected target information provided by the control terminal to determine the deviation therefrom. A change in position of the target may be detected by comparing coordinates of the target (e.g., the coordinates of a center point of the target) within an image to the coordinates of the expected target position. A change in size of the target may be detected by comparing the size of the area (e.g., in pixels) covered by the target with the expected target size. In some embodiments, a change in size may be detected by detecting an orientation, boundaries, or other characteristics of the target.

Based at least in part on the detected deviation, control signals may be generated (e.g., by one or more processors onboard the movable object) that cause adjustment that substantially corrects the detected deviation. As such, the adjustment may be used to substantially maintain one or more expected target characteristics (e.g., target position and/or size) within the images captured by the movable object. In some embodiments, the adjustment may be performed in substantially real time as the movable object is executing user-provided navigation commands (e.g., hovering or moving) and/or predetermined navigation paths. The adjustment may also be performed in substantially real time as the imaging device is capturing one or more images. In some embodiments, the adjustment may be generated based on other information such as sensing data acquired by one or more sensors onboard the movable object (e.g., proximity sensor, or GPS sensor). For example, position information of the target being tracked may be obtained by a proximity sensor and/or provided by the target itself (e.g., GPS location). Such position information may be used, in addition to the detected deviation, to generate the adjustment.

The adjustment may pertain to the movable object, the carrier, and/or the payload (e.g., imaging device). For example, the adjustment may cause the movable object and/or the payload (e.g., imaging device) to change its position, attitude, orientation, angular and/or linear velocity, angular and/or linear velocity, and the like. The adjustment may cause the carrier to move the payload (e.g., imaging device) relative to the movable object such as around or along one, two, three, or more axes. Furthermore, the adjustment may include adjustment to the zoom, focus, or other operational parameters of the payload (e.g., imaging device) itself (e.g., zoom in/out).

In some embodiments, the adjustment may be generated based at least in part on the type of detected deviation. For example, a deviation from the expected target position may require rotation of the movable object and/or the payload (e.g., via the carrier) around one, two, or three rotational axes. As another example, a deviation from the expected target size may require translational movement of the movable object along a suitable axis and/or changes to the zoom of the imaging device (e.g., zoom in or out). For example, if the current or actual target size is smaller than the expected target size, the movable object may need to be moved closer to the target and/or the imaging device may need to be zoomed in to the target. On the other hand, if the current or actual target size is larger than the expected target size, the movable object may need to be moved farther away from the target and/or the imaging device may need to be zoomed out from the target.

In various embodiments, the adjustment to substantially correct the deviation from expected target information may be achieved by controlling one or more controllable objects such as the movable object, the carrier, the imaging device, or any combination thereof via control signals. In some embodiments, the controllable objects may be selected to implement an adjustment and the corresponding control signals may be generated based at least in part on the configurations or settings of the controllable objects. For example, an adjustment that involves rotation around two axes (e.g., yaw and pitch) may be achieved solely by corresponding rotation of the movable object around the two axes if the imaging device is rigidly coupled to the movable object and hence not permitted to move relative to the movable object. Such may be the case when the imaging device is directly coupled to the movable object, or when the imaging device is coupled to the movable object via a carrier that does not permit relative movement between the imaging device and the movable object. The same two-axis adjustment may be achieved by combining adjustment to both the movable object and the carrier if the carrier permits the imaging device to rotate around at least one axis relative to the movable object. In this case, the carrier can be controlled to implement the rotation around one or two of the two axes required for the adjustment and the movable object can be controlled to implement the rotation around one or two of the two axes. For example, the carrier may include a one-axis gimbal that allows the imaging device to rotate around one of the two axes required for adjustment while the rotation around the remaining axis is achieved by the movable object. Alternatively, the same two-axis adjustment may be achieved by the carrier alone if the carrier permits the imaging device to rotate around two or more axes relative to the movable object. For instance, the carrier may include a two-axis or three-axis gimbal.

As another example, an adjustment to correct a change in size of the target may be achieved by controlling the zoom in/out of the imaging device (e.g., if the imaging device supports the zoom level required), by controlling the movement of the movable object (e.g., so as to get closer to or farther away from the target), or by a combination of zoom in/out of the imaging device and the movement of the movable object. A processor onboard the movable object may make the determination as to which object or combination of objects to adjust. For example, if the imaging device does not support a zoom level required to maintain the required size of the target within an image, the movable object may be controlled to move instead of or in addition to adjusting the zoom of the imaging device.

In some embodiments, the adjustment may be implemented by taking into account other constraints. For example, in cases where the navigation path of the movable object is predetermined, the adjustment may be implemented by the carrier and/or imaging device without affecting the movement of the movable object. The navigation path of the movable object may be predetermined, for example, if a remote user is actively controlling the navigation of the movable object via a control terminal or if the movable object is navigating (e.g., autonomously or semi-autonomously) according to a pre-stored navigation path.

Examples of other constraints may include maximum and/or minimum limit for rotation angles, angular and/or linear speed, operational parameters, and the like for the movable object, the carrier, and/or the payload (e.g., imaging device). Such maximum and/or minimum threshold values may be used to limit the range of the adjustment. For example, the angular speed of the movable object and/or the imaging device around a certain axis may be capped by a maximum angular speed that is allowed for the movable object, the carrier, and/or the payload (e.g., imaging device). As another example, the linear speed of the movable object and/or the carrier may be capped by a maximum linear speed that is allowed for the movable object, the carrier, and/or the payload (e.g., imaging device). As yet another example, adjustment to the focal length of the imaging device may be limited by the maximum and/or minimum focal length for the particular imaging device. In some embodiments, such limits may be predetermined and depend on the particular configuration of the movable object, the carrier, and/or the payload (e.g., imaging device). In some instances, such configurations may be configurable (e.g., by a manufacturer, administrator, or user).

In some embodiments, the movable object 101 can be configured to provide and the control terminal 112 can be configured to receive data such as sensing data acquired by sensors onboard the movable object 101, and tracking data or information used to indicate characteristics of one or more target tracked by the movable object 101. Examples of sensing data may include image data acquired by an imaging device carried by the movable object 101 or other data acquired by other sensors. For example, real-time or nearly real-time video can be streamed from the movable object 101 and/or the payload 104 (e.g., imaging device) to the control terminal 112. The sensing data may also include data acquired by global positioning system (GPS) sensors, motion sensors, inertial sensors, proximity sensors, or other sensors. Examples of tracking information may include relative or absolute coordinates and/or size of the target within one or more image frames received from the movable object, changes of the target between consecutive image frames, GPS coordinates, or other positional information of the target, and the like. In some embodiments, the tracking information may be used by the control terminal 112 to display the target as being tracked (e.g., via a graphical tracking indicator such as a box around the target). In various embodiments, the data received by the control terminal may include raw data (e.g., raw sensing data as acquired by the sensors) and/or processed data (e.g., tracking information as processed by one or more processors on the movable object).

In some embodiments, the control terminal 112 can be located at a location distant or remote from the movable object 101, carrier 102, and/or payload 104. The control terminal 112 can be disposed on or affixed to a support platform. Alternatively, the control terminal 112 can be a handheld or wearable device. For example, the control terminal 112 can include a smartphone, tablet, laptop, computer, glasses, gloves, helmet, microphone, or suitable combinations thereof.

The control terminal 112 can be configured to display data received from the movable object 101 via a display. The displayed data may include sensing data such as images (e.g., still images and videos) acquired by an imaging device carried by the movable object 101. The displayed data may also include tracking information that is displayed separately from the image data or superimposed on top of the image data. For example, the display may be configured to display the images where the target is indicated or highlighted with a tracking indicator such as a box, circle, or any other geometric shape surrounding the target being tracked. In some embodiments, the images and the tracking indicator are displayed in substantially real-time as the image data and tracking information are received from the movable object and/or as the image data is acquired. In other embodiments, the display may be provided after some delay.

The control terminal 112 can be configured to receive user input via an input device. The input device may include a joystick, keyboard, mouse, stylus, microphone, image or motion sensor, inertial sensor, and the like. Any suitable user input can be used to interact with the terminal, such as manually entered commands, voice control, gesture control, or position control (e.g., via a movement, location or tilt of the terminal). For instance, the control terminal 112 may be configured to allow a user to control a state of the movable object, carrier, payload, or any component thereof by manipulating a joystick, changing an orientation or attitude of the control terminal, interacting with a graphical user interface using a keyboard, mouse, finger, or stylus, or by using any other suitable methods.

The control terminal 112 may also be configured to allow a user to enter target information using any suitable method. In some embodiments, the control terminal 112 may be configured to enable a user to directly select a target from one or more images (e.g., video or snapshot) that is being displayed. For example, the user may select a target by directly touching the screen using a finger or stylus or selection using a mouse or joystick. The user may draw around the target, touch the target in the image, or otherwise select the target. Computer vision or other techniques may be used to determine boundary of target. Otherwise, user input may define the boundary of target. One or more targets may be selected at a time. In some embodiments, the selected target is displayed with a selection indicator to indicate that the user has selected the target for tracking. In some other embodiments, the control terminal may be configured to allow a user to enter or select target type information such as color, texture, shape, dimension, or other characteristics associated with a desired target. For example, the user may type in the target type information, select such information using a graphical user interface, or use any other suitable methods. In some other embodiments, the target information may be obtained from sources other than the user such as a remote or local data store, other computing devices operatively connected to or otherwise in communication with the control terminal, or the like.

In some embodiments, the control terminal allows a user to select between a manual tracking mode and an automatic tracking mode. When the manual tracking mode is selected, a user can specify a specific target to track. For example, the user can manually selects a target from an image being displayed by the control terminal. The specific target information associated with the selected target (e.g., coordinates and/or size) is then provided to the movable object as initial target information of the target. On the other hand, when the automatic tracking mode is selected, the user does not specify a specific target to be tracked. Rather, the user can specify descriptive information about the type of target to be tracked, for example, via a user interface provided by the control terminal. The movable object can then use the initial target information of a specific target or target type information to automatically identify the target to be tracked and subsequently track the identified target.

In general, providing specific target information (e.g., initial target information) requires more user control of the tracking of the target and less automated processing or computation (e.g., image or target recognition) by a processing system onboard the movable object. On the other hand, providing target type information requires less user control of the tracking process but more computation performed by the onboard processing system. The appropriate allocation of the control over the tracking process between the user and the onboard processing system may be adjusted depending on a variety of factors such as the surroundings of the movable object, speed or altitude of the movable object, user preferences, and computing resources (e.g., CPU or memory) available onboard and/or off-board the movable object, the like. For example, relatively more control may be allocated to the user when the movable object is navigating in a relatively complex environment (e.g., with numerous buildings or obstacles or indoor) than when the movable object is navigating in a relatively simple environment (e.g., wide open space or outdoor). As another example, more control may be allocated to the user when the movable object is at a lower altitude than when the movable object is at a higher altitude. As yet another example, more control may be allocated to the movable object if the movable object is equipped with a high-speed processor adapted to perform complex computations relatively quickly. In some embodiments, the allocation of control over the tracking process between user and movable object may be dynamically adjusted based on the factors described herein.

The user input may be used, at least in part, to generate control data such as described herein. The control data may be generated by the control terminal, the movable object, a third device, or any combination thereof. For instance, the user's manipulation of a joystick or the control terminal or an interaction with a graphical user interface may be translated into predetermined control commands for changing a state or parameter of the movable object, carrier, or payload. As another example, a user's selection of a target within an image being displayed by the control terminal may be used to generate initial and/or expected target information for tracking purposes such as an initial and/or expected position and/or size of the target. Alternatively or additionally, the control data may be generated based on information obtained from non-user sources such as a remote or local data store, other computing devices operatively connected to the control terminal, or the like.

Figure 2:
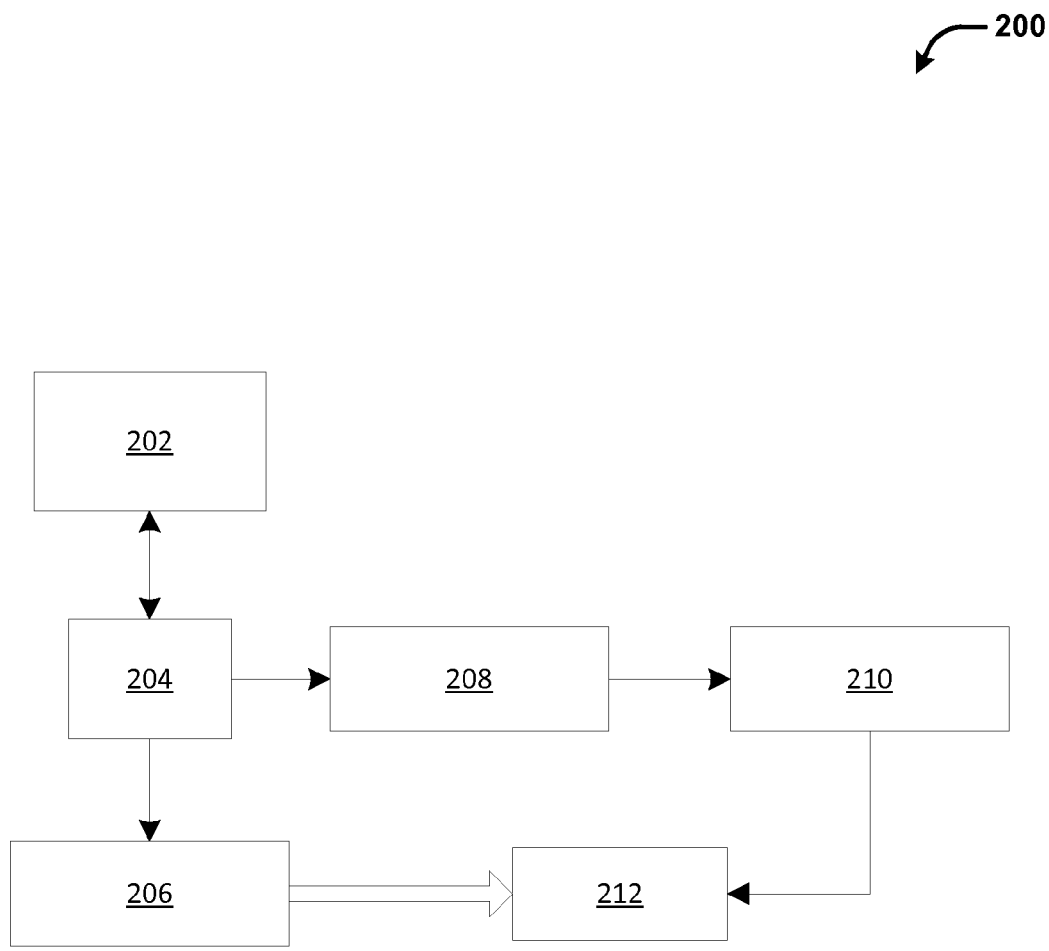
FIG. 2 illustrates exemplary flow of image-related data among components in a tracking system, in accordance with embodiments.

FIG. 2 illustrates exemplary flow 200 of image-related data among components in a tracking system, in accordance with embodiments. In some embodiments, image-related data includes raw or processed image data as well as data extracted or derived from the image data such as tracking information of targets. As illustrated, raw image data can be captured by an image sensor 204. The image sensor 204 may be configured to convert optical signals into electronic signals. The image sensor 204 may include semiconductor charge-coupled devices (CCD), active pixel sensors using complementary metal-oxide-semiconductor (CMOS) or N-type metal-oxide-semiconductor (NMOS, Live MOS) technologies, or any other types of sensors. The image sensor may be coupled to a movable object such as a UAV. For example, the image sensor may be part of an imaging device (e.g., camera) that is carried by a UAV with or without a carrier. The image sensor and/or imaging device may be configured to capture pictures, videos, or any other image data with any suitable parameters such as width, height, aspect ratio, megapixel count, resolution or quality, and the like. For example, the imaging device may be configured to capture high-definition or ultra-high-definition videos (e.g., 720p, 1080i, 1080p, 1440p, 2000p, 2160p, 2540p, 4000p, 4320p, and so on).

The image data captured by the image sensor 204 can be stored in a data storage device 202. The data storage device 202 may be based on semiconductor, magnetic, optical, or any suitable technologies and may include flash memory, USB drives, memory cards, solid-state drives (SSDs), hard disk drives (HDDs), floppy disks, optical disks, magnetic tapes, and the like. For example, the data storage device 202 can include removable storage devices that are detachably couplable to an imaging device such as memory cards of any suitable formats such as PC Card, CompactFlash, SmartMedia, Memory Stick, Memory Stick Duo, Memory Stick PRO Duo, Miniature Card, Multimedia Card (MMC), Reduced Size Multimedia Card (RS-MMC), MMCmicro Card (MMC-micro), PS2 card, Secure Digital (SD) card, SxS, Universal Flash Storage (UFS), miniSD, microSD, xD-Picture Card, Intelligent Stick (iStick), Serial Flash Module (SFM), NT Card, XQD card, and the like. The data storage device 202 can also include external hard disk drives, optical drives, tape drives, floppy drives, and other suitable storage devices that may be operatively connected to the imaging device.

The image data captured by the image sensor 204 can be transmitted to the control terminal 212 by an image transmission module 206. In some embodiments, the image data may be compressed or otherwise processed before being transmitted by the image transmission module 206. In other cases, the image data may not be compressed or processed before being transmitted. The transmitted image data may be displayed on the control terminal 212 so that a user operating the control terminal 212 can view the image data and/or interact with the control terminal 212 based on the image data.

The image data captured by the image sensor 204 can be pre-processed by a pre-processing unit 208. The pre-processing unit 208 can include any hardware, software, or a combination thereof. Examples of pre-processing unit 208 can include a field programmable gate array (FPGA). The pre-processing unit 208 can be operatively coupled to the image sensor 204 to pre-processing of the raw image data before the image data is processed to extract specific piece of information. Examples of tasks performed by the pre-processing unit 208 can include re-sampling to assure the correctness of the image coordinate system, noise reduction, contrast enhancement, scale space representation, and the like.

The image data, as processed by the pre-processing unit 208, can be further processed by a processing unit 210 that is operatively coupled to the pre-processing unit 208 (e.g., via a general purpose memory controller (GPMC) connection). The processing unit 210 can include one or more ARM processors. The processing unit 210 can be configured to perform any suitable embodiments of the methods described herein. Examples of tasks performed by the processing unit 210 may include feature extraction at any suitable level of complexity, image segmentation, data verification, image recognition, image registration, image matching, and the like. In some embodiments, the processing unit 210 produces tracking information related to a target that is being tracked by the movable object. The tracking information may be generated based on image processing by a processing unit of the movable object and/or based on target information as provided by the control terminal. The tracking information may include, for example, the location, size, or other characteristics of a target within one or more images.

The tracking information as determined by the processing unit 210 can be provided to the control terminal 212 via a communication module (not shown). In some embodiments, the communication module may be separate from the image transmission module 206 described above. In other embodiments, the communication module may include or be included in the image transmission module 206. Any suitable means of communication can be used for the communication module and/or the image transmission module 206, such as wired communication or wireless communication. For example, the communication module and/or the image transmission module 206 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. In addition to tracking information, the communication module can also be configured to transmit and/or receive sensing data from other sensors onboard the movable object, positional and/or motion information determined by processing the sensing data, predetermined control data, user commands from remote control terminals, and the like.

In some embodiments, the image data, as provided by the image transmission module 206, may be augmented by or otherwise combined with the tracking information, as produced by the processing unit 210, to show a target with a tracking indicator (e.g., a circle or box around the target). A user may view the augmented image data to see the target as it is being tracked by the imaging device. The user may also interact with the control terminal based on the augmented image data. For example, the user may select a different target to track from the augmented image data (e.g., by touching an area of the screen corresponding to the different target).

In some embodiments, the tracking information can be provided to the control terminal 212 in response to a demand by the control terminal 212. For example, the control terminal 212 may demand such tracking information only when a user elects to a certain viewing mode (e.g., a preview mode) where the target being tracked is highlighted or otherwise indicated. Alternatively or additionally, the tracking information may be provided to the control terminal 212 without any demand by the control terminal 212. For example, the tracking information may be pushed to the control terminal 212 on a periodic basis (e.g., every 0.1 second, 0.2 second, 0.5 second, 1 second, or 2 second).

Figure 3:
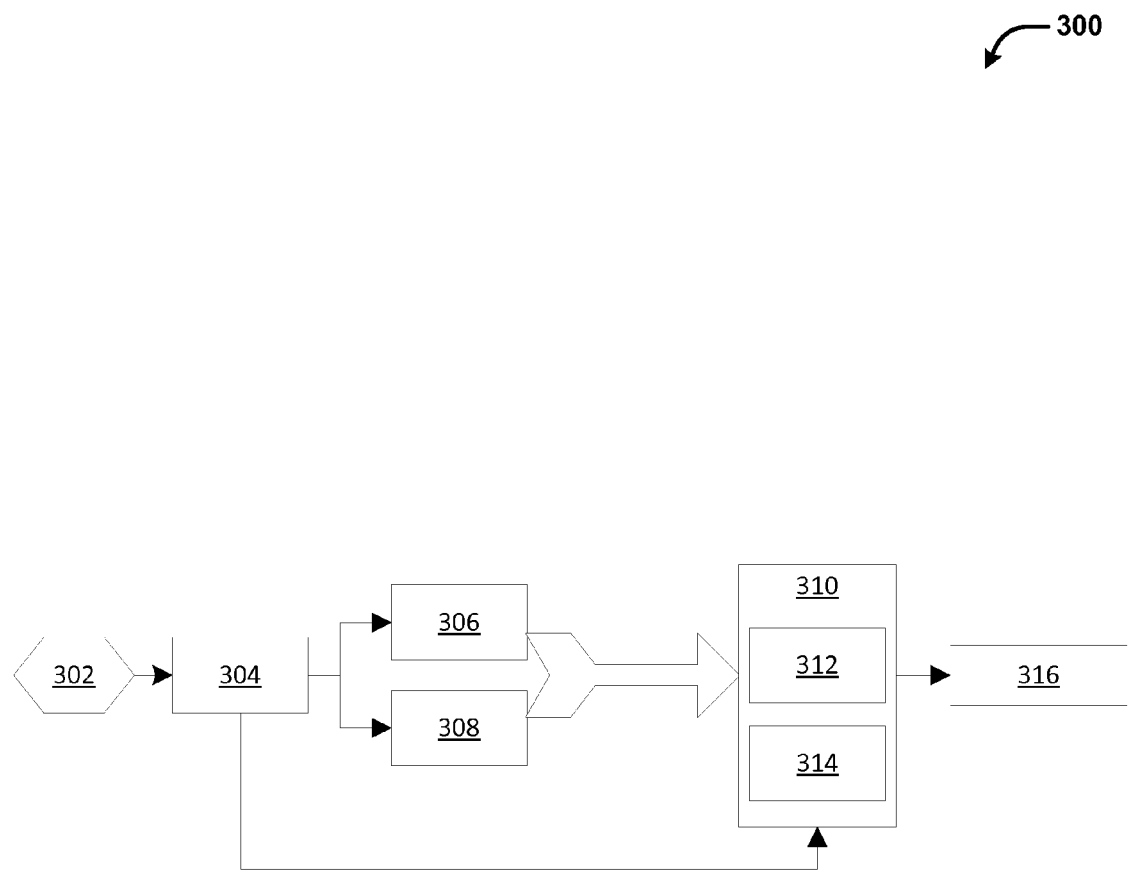
FIG. 3 illustrates exemplary flow of control data among components in a tracking system, in accordance with embodiments.

FIG. 3 illustrates exemplary flow 300 of control data among components in a tracking system, in accordance with embodiments. As discussed above, control data can include target information used by a movable object (e.g., a UAV) to track a target, as well as other data for controlling various aspects of the movable object or a component thereof. The control data can be generated by a user 302 interacting with a control terminal 304. The generated control data can include specific target information (e.g., initial target information) 306 and target type information 308.

Specific target information 306 can include characteristics about a specific target such as coordinates (e.g., pixel coordinates), size, and the like. In some embodiments, specific target information 306 can be generated when a user selects or specifies a specific target to track via a user interface provided by the control terminal 304. For example, the control terminal may allow a user to select between a manual tracking mode and an automatic tracking mode. When the manual tracking mode is selected, a user can specify a specific target to track (e.g., by selecting a target from one or more images being displayed). Based on the user selection, specific target information may be generated.

Target type information 308 can include information describing a type of targets to be tracked rather than information about a specific target. Such target type information may include various target characteristics such as color, texture, pattern, size, shape, dimension, and the like. In some embodiments, the target information (including specific target information and target type information) may be generated at least in part on user input at the control terminal 304. For example, the control terminal may allow a user to select between a manual tracking mode and an automatic tracking mode. When the automatic tracking mode is selected, a user can enter or select target type information. Additionally or alternatively, the target information may be generated based on data from other sources. For example, target type information may be derived based on previous images and/or extracted from local or remote data stores. In some embodiments, predefined target types or patterns may be presented to the user for selection. In some other embodiments, the predefined target types or patterns may be provided automatically by default to the movable object without user intervention.

Target information can optionally include expected target information such as described herein. The expected target information may or may not overlap with the initial target information.

The target information (including specific target information 306 and target type information 308) can be provided to a processing system 310, for example, via a communication module (not shown). The processing system 310 may be onboard a movable object (e.g., UAV). The processing system 310 may include a data processing unit 312 and a command control unit 314. The data processing unit 312 may be configured to perform any embodiments of the methods described herein. For instance, the data processing unit 312 can be configured to identify target based on target information (e.g., including specific target information 306 and/or target type information 308), determine deviation from the target information, and the like. The data processing unit 312 may include a pre-processing unit and/or a processing unit such as similar to the pre-processing unit 208 and processing unit 210 respectively described in FIG. 2. For example, the data processing unit 312 may include an FPGA and/or one or more ARM processors.

The data processing unit 312 may be operatively coupled to a command control module 314 configured to control a state of the movable object. The command control module 314 may be configured to perform any embodiments of the methods described herein. For instance, the command control module 314 can be configured to generate control commands or signals 316 for controlling a component of the movable object so as to substantially track the target based on the results from the data processing unit 312.

The control commands 316 can include commands for the propulsion mechanisms of the movable object to adjust the spatial disposition, velocity, and/or acceleration of the movable object with respect to up to six degrees of freedom in order to correct a detected deviation of the target with respect to its position and/or size in one or more of the images. The control commands 316 can also include commands for adjusting the state of a carrier so as to adjust the spatial disposition, velocity, and/or acceleration of a payload (e.g., imaging device) carried by the movable object via the carrier.

The control commands 316 can also include commands for adjusting the state of a carrier so as to adjust the spatial disposition, velocity, and/or acceleration of a payload (e.g., imaging device) carried by the movable object via the carrier.

The control commands 316 can also include commands for adjusting one or more operating parameters of the payload such as taking still or moving pictures, zooming in or out, turning on or off, switching imaging modes, change image resolution, changing focus, changing depth of field, changing exposure time, changing speed of lens, changing viewing angle or field of view, or the like.

Alternatively or additionally, any of the above control commands can be provided directly from the control terminal 304 to the processing system 310. For example, the user may use the control terminal 304 to control the zoom in/out of the imaging device while the processing system 310 generates the control commands for the movable object and/or the carrier. As another example, the user may directly control the movable object while the processing system 310 generates the control commands for the movable object and/or the imaging device. This may allow a user to focus on controlling the navigation of the movable object without having to worry about tracking the target, which is performed automatically by the processing system 310.

In various embodiments, the allocation of tracking control between the user and the automatic tracking system can vary depending on a variety of factors such as the surroundings of the movable object, speed or altitude of the movable object, user preferences, and computing resources (e.g., CPU or memory) available onboard and/or off-board the movable object, the like. For example, relatively more control may be allocated to the user when the movable object is navigating in a relatively complex environment (e.g., with numerous buildings or obstacles or indoor) than when the movable object is navigating in a relatively simple environment (e.g., wide open space or outdoor). As another example, more control may be allocated to the user when the movable object is at a lower altitude than when the movable object is at a higher altitude. As yet another example, more control may be allocated to the movable object if the movable object is equipped with a high-speed processor adapted to perform complex computations relatively quickly. In some embodiments, the allocation of control over the tracking process between user and movable object may be dynamically adjusted based on the factors described herein.

According to an aspect of the present invention, methods and systems are provided for tracking a target by an imaging device coupled to a movable object so as to substantially maintain an expected position and/or size of the target within one or more images captured by the imaging device.

Figure 4:
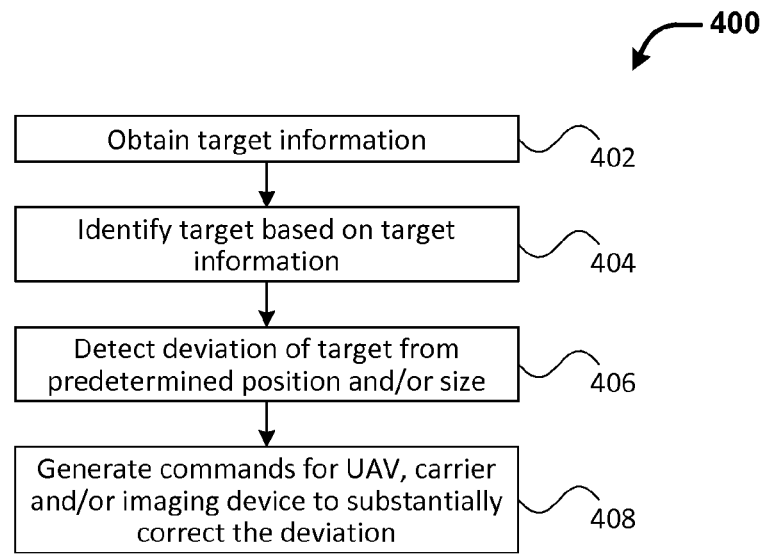
FIG. 4 illustrates an exemplary process for implementing target tracking, in accordance with embodiments.

FIG. 4 illustrates an exemplary process 400 for implementing target tracking, in accordance with embodiments. Aspects of the process 400 may be performed by one or more processors onboard and/or off-board a movable object as described herein such as a UAV. Some or all aspects of the process 400 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes.

The process 400 includes obtaining 402 target information for one or more targets. The target information can be received from a control terminal such as described herein. Additionally or alternatively, the target information may be obtained from a component (e.g., memory) onboard a movable object (e.g., UAV) or a device remote from the movable object such as another movable object (e.g., another UAV), a server, or the like. In some cases, the target information about a target may be provided by the target itself.

In various embodiments, the target information may include initial target information specific to a particular known target or target type information about potentially unknown target(s). Specific target information include coordinates (e.g., pixel coordinates), size, location, and other information about a target within one or more images. Specific target information may be generated based on user interaction with existing image data such as described herein. For example, specific target information may be generated when a user selects a particular object as target from one or more images displayed to the user. The specific target information may include the initial position and/or size of the target as the target is selected by a remote user from within one or more images.

Target information may also include target type information such as color, texture, dimension, size, location, and/or any other characteristics about a type or group of potentially unknown or unidentified targets. Target type information may be specifically entered by a user. Alternatively, the user may select a pre-existing target pattern or type (e.g., a black object or a round object with a radius greater or less than a certain value). In some embodiments, the user may provide target type information by selecting one or more targets from within one or more images. Features or characteristics of the selected targets may then be extracted and/or generalized to produce the target type information, which may be used to identify other targets with similar features or characteristics. In various embodiments, such feature extraction may be performed by a control terminal, a processing unit on the movable object, or third device.

Target information (including specific target information and target type information) may optionally include expected characteristics at which the target, if identified, should maintain while the target is tracked. For example, the target information may include an expected position of the target as expressed by absolute or relative coordinates within an image. The tracking system may be configured to track the target such that the target is kept, within a predefined degree of tolerance, at substantially the same expected position over time. Alternatively or additionally, the target information may include an expected size of the target (e.g., as expressed by a number of pixels occupied by the target). The tracking system may be configured to track the target such that the target is kept, within a predefined degree of tolerance, at substantially the same expected size. Such expected target information may be the same or different from the initial target information for a specific target. The initial target information is typically used to identify a target. Once the target has been identified, the expected target information may be used to detect any deviation from the expected target information so that such deviation can be corrected. In some cases, the target information may also include other values such as a time value or expiration time indicating a period of time during which the target should be tracked, if identified, a flag indicating whether the target information includes specific target information or target type information, and the like.

In some embodiments, the expected target information at which the target is to maintain may be provided by the control terminal. For example, the expected target information may be generated based on user input to the control terminal or based on a configuration file or data store local or remote to the control terminal. In some other embodiments, the expected target information may be provided by the movable object. For example, the movable object may be configured, by default, to keep a target at substantially the center of an image, or at around particular coordinates of the image. As another example, the movable object may be configured, by default, to keep the target as captured by the imaging device, at a particular size. In yet some other embodiments, the expected target information may be provided by some other objects or device external to the movable object.

Once the target information is received, the process 400 includes identifying 404 a target based on the target information, e.g., based on target type information. Any suitable image recognition or identification techniques may be used including approaches based on CAD-like object models (e.g., edge detection, primal sketch, Man, Mohan and Nevatia, Lowe, or Olivier Faugeras), appearance-based methods (e.g., using edge matching, divide-and-conquer search, greyscale matching, gradient matching, histograms of receptive field responses, or large model bases), feature-based methods (e.g., using interpretation trees, hypothesizing and testing, pose consistency, pose clustering, invariance, geometric hashing, Scale-invariant feature transform (SIFT), or Speeded Up Robust Features (SURF)), genetic algorithms, and the like.

After the target has been identified, subsequent images captured by the imaging device may be monitored to detect 406 a deviation of the target from certain expected characteristics that the target should maintain such as expected position and/or size. As discussed above, the expected target information may be supplied by a control terminal (e.g., based on user input), a configuration file or memory associated with the movable object, or from some other sources. The expected target information may or may not be the same as the initial target information. The deviation of the target may be achieved by comparing the target's respective position, size and/or any other suitable characteristics in one or more images with expected characteristics. Any suitable image recognition or identification techniques such as discussed herein may be used.

In some embodiments, the expected target information is considered substantially maintained when the detected deviation falls within certain predefined tolerance values. In such cases, the deviation may be considered negligible and no corrective adjustment is required. Only when the deviation exceeds the predefined tolerance value is corrective adjustment required. For example, when the current position of the target is within a predetermined number of pixels from the expected coordinates, the deviation may be considered negligible and hence no corrective adjustment is required. Similarly, when the current size of the target is within a predetermined number of pixels from the expected size, the deviation may be considered negligible. The predefined degree of tolerance may be defined by system parameters, configured by users operating the control terminal, or otherwise defined.

In order to correct the deviation and maintain substantially the expected characteristics of the target, control signals or commands can be generated 408 for adjusting the movable carrier, and/or imaging device. In some embodiments, deviations in the position of the target can be corrected via adjustment to the attitude of the movable object and/or the imaging device (via the carrier), such as discussed in further detail in FIG. 6. For example, such adjustment may involve changing angular velocity of the movable object and/or imaging device around one or more rotational axes. Deviations in the size of the target can be corrected via adjustment to the position of the movable object and/or to the operational parameters of the imagining device, such as discussed in further detail in FIG. 7. For example, such adjustment may involve changing linear velocity of the movable object along an axis. Alternatively or additionally, the adjustment may involve changing the zoom, focus, or other characteristics associated with the imaging device.

In some embodiments, the adjustment may be limited by constraints imposed by system configuration, by the user operating a control terminal, or by other entities. Examples of such constraints may include maximum and/or minimum limit for rotation angles, angular and/or linear speed, and the like for the movable object (e.g., the propulsion system thereof), the carrier (e.g., an actuation member thereof), the imaging device, or the like. Such threshold values may be used to limit the range of the adjustment. For example, an adjustment involving the angular speed of the movable object and/or the imaging device relative to the movable object (via a carrier) around a certain axis may be capped by a maximum angular speed that is allowed for the movable object and/or the carrier. As another example, an adjustment involving the linear speed of the movable object and/or the imaging device relative to the movable object (via a carrier) may be capped by a maximum linear speed that is allowed for the movable object and/or the carrier. In some embodiments, such limits may be predetermined and depend on the particular configuration of the movable object, carrier, and/or the imaging device. In some embodiments, the limits may be configurable (e.g., by a manufacturer, administrator, or user).

In some embodiments, warning indicators may be provided when the adjustment is modified according to the constraints described above (e.g., when the angular speed of the movable object and/or the carrier around a certain axis is capped by a maximum angular speed that is allowed for the movable object and/or the carrier). Examples of such warning indicators may include textual, audio (e.g., siren or beeping sound), visual (e.g., certain color of light or flashing light), kinetic (e.g., vibration or movement), any other suitable types of signals. Such warning indicators may be provided directly by the movable object or a component thereof. Alternatively or additionally, warning indicators may be provided by the control terminal (e.g., via the display). In the latter case, the control terminal may provide the warning indicators based on signals from the movable object.

In some embodiments, the adjustment may be performed in substantially real time as the movable object is executing user-provided navigation commands or a predetermined flight path, and/or as the imaging device is capturing one or more images. In some embodiments, the adjustment may be generated based on other information such as sensing data acquired by one or more sensors onboard the movable object (e.g., proximity sensor, or GPS sensor). For example, position information of the target being tracked may be obtained by a proximity sensor and/or provided by the target itself (e.g., GPS location). Such position information may be used, in addition to the detected deviation, to generate the adjustment control signals to track the target such as described herein.

In various embodiments, detection 406 of deviation from expected target information and/or generation 408 of control commands to correct the detected deviation may be repeated for a predefined or indefinite period of time. In some embodiments, such deviation detection and/or control command generation may be performed at certain intervals (e.g., every 0.01 second, 0.1 second, 0.2 second, 0.5 second, or 1 second).

Figure 5:
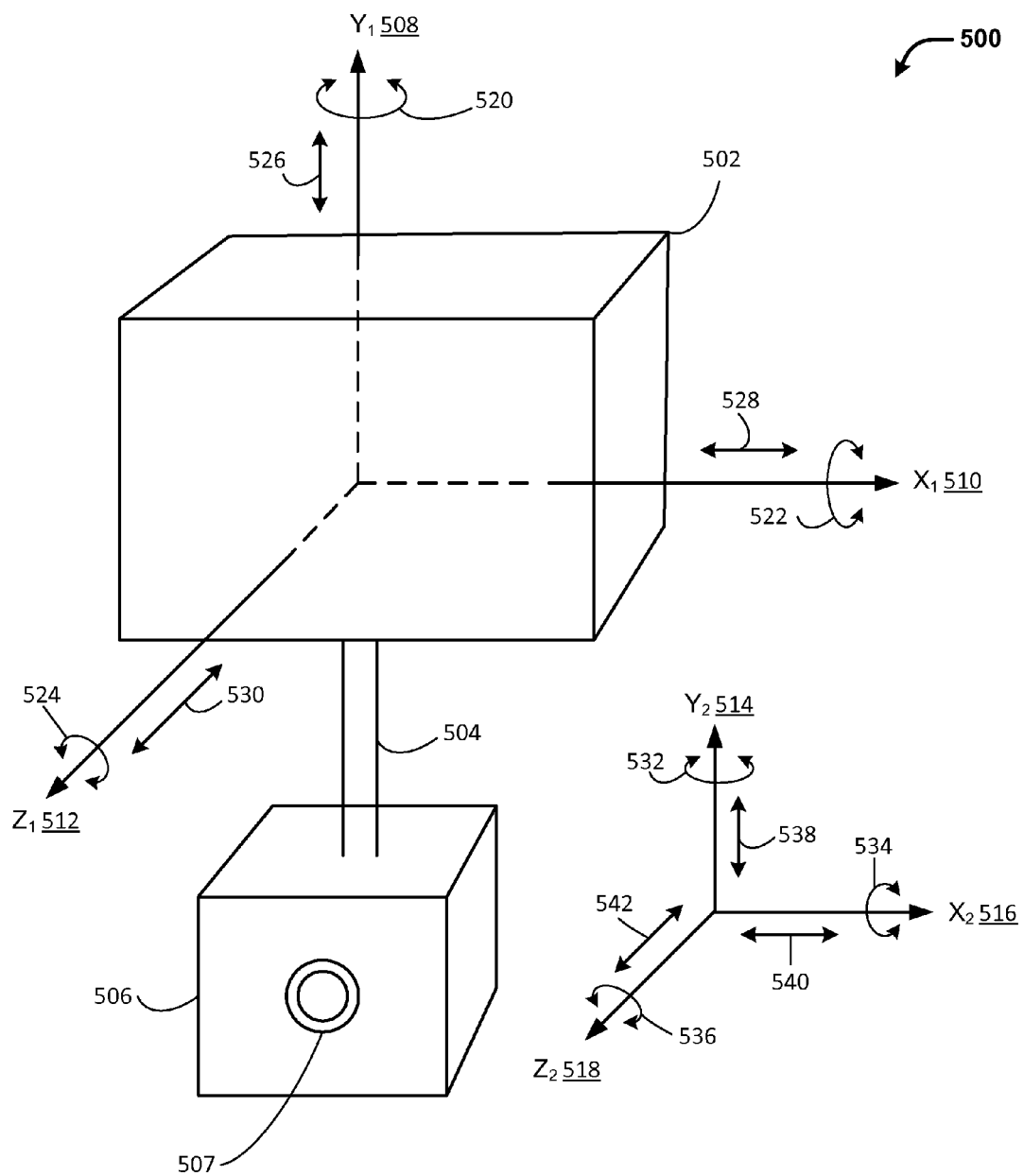
FIG. 5 illustrates an exemplary configuration of a movable object, carrier, and payload, in accordance with embodiments.

FIG. 5 illustrates an exemplary configuration 500 of a movable object, carrier, and payload, in accordance with embodiments. The configuration 500 is used to illustrate exemplary types of adjustment to the movable object 502 and/or payload 506 that may be used to track a target. The movable object 502 and the payload 506 can include any embodiments discussed herein. For example, the movable object 502 can include a UAV and the payload 506 can include an imaging device.

The movable object 502 may be capable of rotating around up to three orthogonal axes, such as $X_1$ (pitch) 510, $Y_1$ (yaw) 508 and $Z_1$ (roll) 512 axes. The rotations around the three axes can be referred to as the pitch rotation 522, yaw rotation 520, and roll rotation 524, respectively. The angular velocities of the movable object 502 around the $X_1$, $Y_1$, and $Z_1$ axes can be expressed as $\omega_{X1}$, $\omega_{Y1}$, and $\omega_{Z1}$, respectively. The movable object 502 may also be capable of translational movements 528, 526, and 530 along the $X_1$, $Y_1$, and $Z_1$ axes, respectively. The linear velocities of the movable object 502 along the $X_1$, $Y_1$, and $Z_1$ axes can be expressed as $V_{X1}$, $V_{Y1}$, and $V_{Z1}$, respectively.

In the exemplary configuration, the payload 506 is coupled to the movable object 502 via a carrier 504. The carrier 504 may be capable of causing the payload 506 to move relative to the movable object around and/or along up to three orthogonal axes, $X_2$ (pitch) 516, $Y_2$ (yaw) 514 and $Z_2$ (roll) 518. The $X_2$, $Y_2$, and $Z_2$ axes may be respectively parallel to the $X_1$, $Y_1$, and $Z_1$ axes. In some embodiments, where the payload is an imaging device including an optical module 507, the roll axis $Z_2$ 518 may be substantially parallel to an optical path or optical axis for the optical module 507. The optical module 507 may be optically coupled to an image sensor such as described herein to capture images. The carrier 504 may cause the carrier 506 to rotate around up to three orthogonal axes, $X_2$ (pitch) 516, $Y_2$ (yaw) 514 and $Z_2$ (roll) 518 based on control signals provided to actuators associated with the carrier such as electric motors. The rotations around the three axes can be referred to as the pitch rotation 534, yaw rotation 532, and roll rotation 536, respectively. The angular velocities of the payload 506 around the $X_2$, $Y_2$, and $Z_2$ axes can be expressed as $\omega_{X2}$, $\omega_{Y2}$, and $\omega_{Z2}$, respectively. The carrier 504 may also cause the payload 506 to engage in translational movements 540, 538, and 542, along the $X_2$, $Y_2$, and $Z_2$ axes relative to the movable object 502. The linear velocity of the payload 506 along the $X_2$, $Y_2$, and $Z_2$ axes can be expressed as $V_{X2}$, $V_{Y2}$, and $V_{Z2}$, respectively.

In some embodiments, the carrier 504 may only permit the payload 506 to move around and/or along a subset of the three axes $X_2$, $Y_2$, and $Z_2$ relative to the movable object 502. For instance, the carrier 504 may only permit the payload 506 rotate around $X_2$, $Y_2$, $Z_2$, or any combination thereof, without allowing the payload 506 to move along any of the axes. For example, the carrier 504 may permit the payload 506 to rotate only around one of the $X_2$, $Y_2$, and $Z_2$ axes. The carrier 504 may permit the payload 506 to rotate only around two of the $X_2$, $Y_2$, and $Z_2$ axes. The carrier 504 may permit the payload 506 to rotate around all three of the $X_2$, $Y_2$, and $Z_2$ axes.

In some other cases, the carrier 504 may only permit the payload 506 move along $X_2$, $Y_2$, or $Z_2$ axis, or any combination thereof, without allowing the payload 506 to rotate around any of the axes. For example, the carrier 504 may permit the payload 506 to move along only one of the $X_2$, $Y_2$, and $Z_2$ axes. The carrier 504 may permit the payload 506 to move along only two of the $X_2$, $Y_2$, and $Z_2$ axes. The carrier 504 may permit the payload 506 to move along only all three of the $X_2$, $Y_2$, and $Z_2$ axes.

In yet some other embodiments, the carrier 504 may allow the payload 506 perform both rotational and translational movement relative to the movable object. For example, the carrier 504 may be configured to allow the payload 506 to move along and/or rotate around one, two, or three of the $X_2$, $Y_2$, and $Z_2$ axes.

In some other embodiments, the payload 506 may be coupled to the movable object 502 directly without a carrier 504, or the carrier 504 may not permit the payload 506 to move relative to the movable object 502. In such cases, the attitude, position and/or orientation of the payload 506 is fixed relative to the movable object 502.

In various embodiments, adjustment to attitude, orientation, and/or position of the payload 506 may be achieved, collectively or individually, via suitable adjustment to the movable object 502, the carrier 504, and/or the payload 506. For example, a rotation of 60 degrees around a given axis (e.g., yaw axis) for the payload may be achieved by a 60-degree rotation by the movable object alone, a 60-degree rotation by the payload relative to the movable object as effectuated by the carrier, or a combination of 40-degree rotation by the movable object and a 20-degree rotation by the payload relative to the movable object.

Similarly, a translational movement for the payload may be achieved, collectively or individually, via adjustment to the movable object 502 and the carrier 504. The desired adjustment may, additionally or alternatively, be achieved by adjustment to the operational parameters of the payload. Such operational parameters of the payload may include, for example, a zoom in/out level or a focal length of an imaging device.

Figure 6:
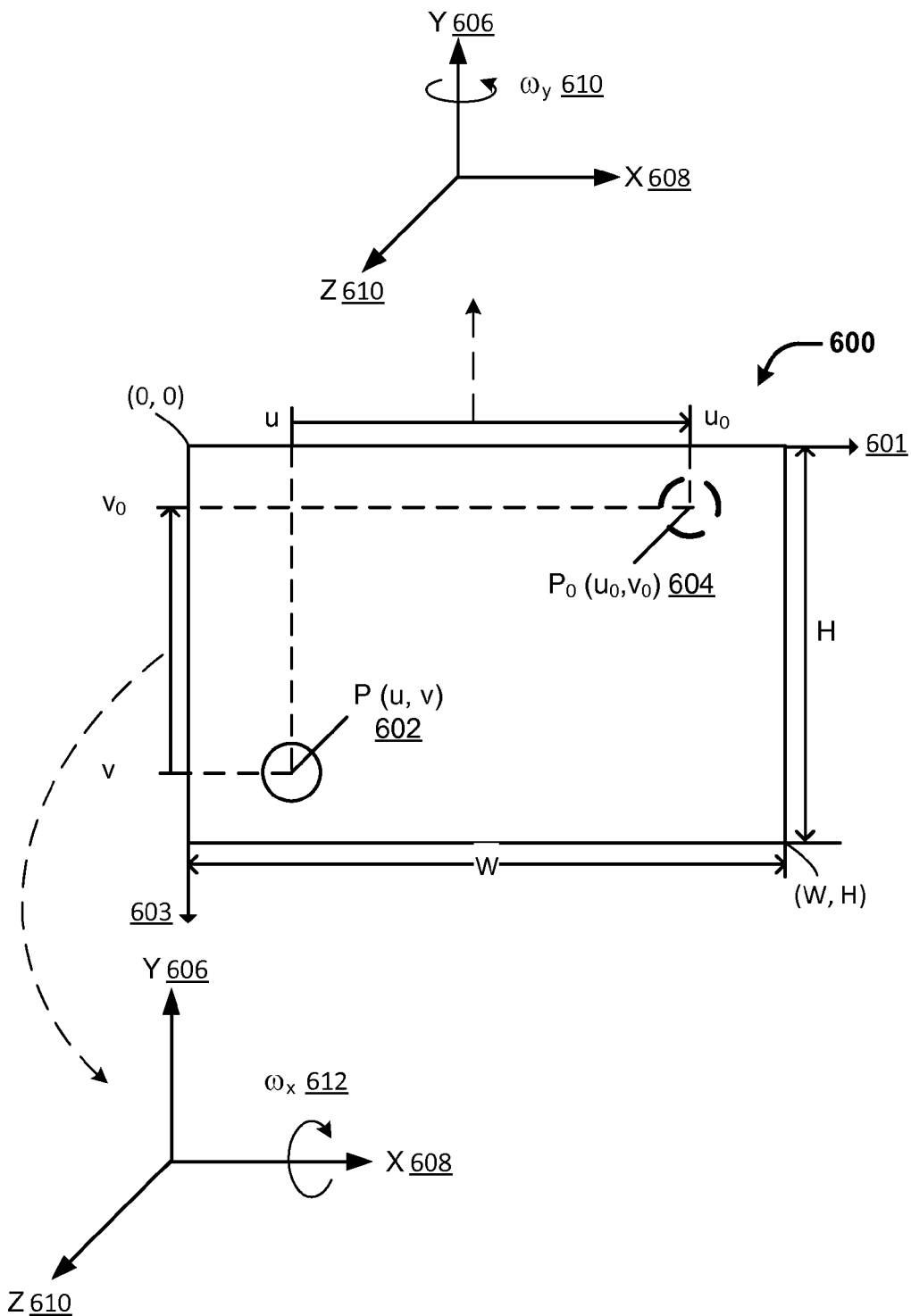
FIG. 6 illustrates an exemplary tracking method for maintaining an expected position of a target, in accordance with embodiments.

FIG. 6 illustrates an exemplary tracking method for maintaining an expected position of a target, in accordance with embodiments. An exemplary image 600 is shown such as captured by an imaging device carried by a movable object. Assume that the image has a width of W pixels and a height of H pixels (where W and H are positive integers). A position within the image can be defined by a pair of coordinates along a horizontal axis 601 (along the width of the image) and a vertical axis 603 (along the height of the image), where the upper left corner of image has coordinates (0, 0) and the lower right corner of the image has coordinates (W, H).

Assume that a target, as captured in the image 600, is located at position P (u, v) 602, and the expected position of the target is $P_0$ ($u_0$, $v_0$) 604 that is different from P 602. In some embodiments, the expected position of the target $P_0$ ($u_0$, $v_0$) may be near the center of the image, such that $u_0$=W/2, and/or $v_0$=H/2. In other embodiment, the expected position of the target may be located anywhere else within the image (e.g., off-center). In various embodiments, the expected position of the target may or may not be the same as the initial position of the target (e.g., as provided by the control terminal). Assuming that the current position P is deviated from the expected position $P_0$ such that the deviation exceeds a predetermined threshold (such as expressed by a $\Delta x$ from $u_0$, and a $\Delta y$ from $v_0$), then an adjustment is required to bring the target position from P to close to the expected position $P_0$.

In some embodiments, the deviation from the expected target position can be used to derive one or more angular velocities for rotating the field of view of the imaging device around one or more axes. For example, deviation along the horizontal axis 601 of the image (e.g., between u and $u_0$) may be used to derive an angular velocity $\omega_Y$ 610 for rotating the field of view of the imaging device around the Y (yaw) axis 606, as follows:

$$\omega_Y = \alpha^*(u - u_0), \text{ where } \alpha \in \mathbb{R} \text{ (real numbers)} \quad (1)$$

The rotation around the Y axis for the field of view of an imaging device may be achieved by a rotation of the movable object, a rotation of the payload (via a carrier) relative to the movable object, or a combination of both. In some embodiments, adjustment to the payload may be selected when adjustment to the movable object is infeasible or otherwise undesirable, for example, when the navigation path of the movable object is predetermined. In the equation (1), a is a constant that may be predefined and/or calibrated based on the configuration of the movable object (e.g., when the rotation is achieved by the movable object), the configuration of the carrier (e.g., when the rotation is achieved by the carrier), or both (e.g., when the rotation is achieved by a combination of the movable object and the carrier). In some embodiments, a is greater than zero ($\alpha > 0$). In other embodiments, a may be no greater than zero ($\alpha \leq 0$). In some embodiments, $\alpha$ can be used to map a calculated pixel value to a corresponding control lever amount or sensitivity for controlling the angular velocity around a certain axis (e.g., yaw axis). In general, the control lever may be used to control the angular or linear movement of a controllable object (e.g., UAV or carrier). Greater control lever amount corresponds to greater sensitivity and greater speed (for angular or linear movement). In some embodiments, the control lever amount or a range thereof may be determined by configuration parameters of the flight control system for a UAV or configuration parameters of a control system for a carrier. The upper and lower bounds of the range of the control lever amount may include any arbitrary numbers. For example, the range of the control lever amount may be (1000, -1000) for one flight control system and (-1000, 1000) for another flight control system.

For instance, assume that the images have a width of W=1024 pixels and a height of H=768 pixels. Thus, the size of the images is 1024*768. Further assume that the expected position of the target has a $u_0$=512. Thus, (u-$u_0$)∈(-512 512). Assume that the range of the control lever amount around the yaw axis is (-1000, 1000), then the maximum control lever amount or maximum sensitivity is 1000 and $\alpha$=1000/512. Thus, the value of a can be affected by image resolution or size provided by the imaging device, range of the control lever amount (e.g., around a certain rotation axis), the maximum control lever amount or maximum sensitivity, and/or other factors.

For instance, when the rotation is achieved by rotation of the movable object, the Y axis 606 of FIG. 6 corresponds to the $Y_1$ axis 508 for the movable object as illustrated in FIG. 5 and the overall angular velocity of the field of view $\omega_Y$ is expressed as the angular velocity $\omega_{Y1}$ for the movable object:

$$\omega_Y = \omega_{Y1} = \alpha_1^*(u - u_0), \text{ where } \alpha_1 \in \mathbb{R} \quad (2)$$

In the equation (2), $\alpha_1$ is a constant that is defined based on the configuration of the movable object. In some embodiments, $\alpha_1$ is greater than zero ($\alpha_1 > 0$). The $\alpha_1$ can be defined similar to the a discussed above. For example, the value of $\alpha_1$ may be defined based on image resolution or size and/or range of control lever amount for the movable object (e.g., around the yaw axis).

Similarly, when the rotation is achieved by the rotation of the payload relative to the movable object (e.g., via the carrier), the Y axis 606 of FIG. 6 corresponds to the $Y_2$ axis 514 for the payload as illustrated in FIG. 5 and the overall angular velocity of the field of view $\omega_Y$ is expressed as the angular velocity $\omega_{Y2}$ for the payload relative to the movable object:

$$\omega_Y = \omega_{Y2} = \alpha_2^*(u - u_0), \text{ where } \alpha_2 \in \mathbb{R} \quad (3)$$

In the equation (3), $\alpha_2$ is a constant that is defined based on the configuration of the carrier and/or payload. In some embodiments, $\alpha_2$ is greater than zero ($\alpha_2 > 0$). The $\alpha_2$ can be defined similar to the a discussed above. For example, the value of $\alpha_2$ may be defined based on image resolution or size and/or range of control lever amount for the carrier (e.g., around the yaw axis).

In general, the angular velocity of the field of view around the Y (yaw) axis 606 can be expressed as a combination of the angular velocity $\omega_{Y1}$ for the movable object and the angular velocity $\omega_{Y2}$ for the payload relative to the movable object, such as the following:

$$\omega_Y = \omega_{Y1} + \omega_{Y2} \quad (4)$$

In the equation (4), either $\omega_{Y1}$ or $\omega_{Y2}$ may be zero.

As illustrated herein, the direction of the rotation around the Y (yaw) axis may depend on the sign of u-$u_0$. For instance, if the expected position is located to the right of the actual position (as illustrated in FIG. 6), then u−u₀<0, and the field of view needs to rotate in a counter-clockwise fashion around the yaw axis 606 (e.g., pan left) in order to bring the target to the expected position. On the other hand, if the expected position is located to the left of the actual position, then u−u₀>0, and the field of view needs to rotate in a clockwise fashion around the yaw axis 606 (e.g., pan right) in order to bring the target to the expected position.

As illustrated herein, the speed of rotation (e.g., absolute value of the angular velocity) around a given axis (e.g., the Y (yaw) axis) may depend on the distance between the expected and the actual position of the target along the axis (i.e., |u−u₀|). The further the distance is, the greater the speed of rotation. Likewise, the closer the distance is, the slower the speed of rotation. When the expected position coincides with the position of the target along the axis (e.g., u=u₀), then the speed of rotation around the axis is zero and the rotation stops.

The method for adjusting the deviation from the expected target position and the actual target position along the horizontal axis 601, as discussed above, can be applied in a similar fashion to correct the deviation of the target along a different axis 603. For example, deviation along the vertical axis 603 of the image (e.g., between v and v₀) may be used to derive an angular velocity $\omega_X$ 612 for the field of view of the imaging device around the X (pitch) axis 608, as follows:

$$\omega_X = \beta * (v - v_0), \text{ where } \beta \in \mathbb{R} \quad (5)$$

The rotation around the X axis for the field of view of an imaging device may be achieved by a rotation of the movable object, a rotation of the payload (via a carrier) relative to the movable object, or a combination of both. Hence, in the equation (5), β is a constant that may be predefined and/or calibrated based on the configuration of the movable object (e.g., when the rotation is achieved by the movable object), the configuration of the carrier (e.g., when the rotation is achieved by the carrier), or both (e.g., when the rotation is achieved by a combination of the movable object and the carrier). In some embodiments, β is greater than zero (β>0). In other embodiments, β may be no greater than zero (β≤0). In some embodiments, β can be used to map a calculated pixel value to a corresponding control lever amount for controlling the angular velocity around a certain axis (e.g., pitch axis). In general, the control lever may be used to control the angular or linear movement of a controllable object (e.g., UAV or carrier). Greater control lever amount corresponds to greater sensitivity and greater speed (for angular or linear movement). In some embodiments, the control lever amount or a range thereof may be determined by configuration parameters of the flight control system for a UAV or configuration parameters of a carrier control system for a carrier. The upper and lower bounds of the range of the control lever amount may include any arbitrary numbers. For example, the range of the control lever amount may be (1000, −1000) for one control system (e.g., flight control system or carrier control system) and (−1000, 1000) for another control system.

For instance, assume that the images have a width of W=1024 pixels and a height of H=768 pixels. Thus, the size of the images is 1024*768. Further assume that the expected position of the target has a v₀=384. Thus, (v−v₀)∈(−384 384). Assume that the range of the control lever amount around the pitch axis is (−1000, 1000), then the maximum control lever amount or maximum sensitivity is 1000 and β=1000/384. Thus, the value of β can be affected by image resolution or size provided by the imaging device, range of the control lever amount (e.g., around a certain rotation axis), the maximum control lever amount or maximum sensitivity, and/or other factors.

For instance, when the rotation is achieved by rotation of the movable object, the X axis 608 of FIG. 6 corresponds to the $X_1$ axis 510 for the movable object as illustrated in FIG. 5 and the angular velocity of the field of view $\omega_X$ is expressed as the angular velocity $\omega_{X1}$ for the movable object:

$$\omega_X = \omega_{X1} = \beta_1 * (v - v_0), \text{ where } \beta_1 \in \mathbb{R} \quad (6)$$

In the equation (6), $\beta_1$ is a constant that is defined based on the configuration of the movable object. In some embodiments, is greater than zero ($\beta_1$>0). The can be defined similar to the β discussed above. For example, the value of may be defined based on image resolution or size and/or range of control lever amount for the movable object (e.g., around the pitch axis).

Similarly, when the rotation is achieved by the rotation of the payload relative to the movable object (e.g., via the carrier), the X axis 608 of FIG. 6 corresponds to the $X_2$ axis 516 for the payload as illustrated in FIG. 5 and the angular velocity of the field of view $\omega_X$ is expressed as the angular velocity $\omega_{X2}$ for the payload relative to the movable object:

$$\omega_X = \omega_{X2} = \beta_2 * (v - v_0), \text{ where } \beta_2 \in \mathbb{R} \quad (6)$$

In the equation (6), $\beta_2$ is a constant that is defined based on the configuration of the carrier and/or payload. In some embodiments, $\beta_2$ is greater than zero ($\beta_2$>0). The $\beta_2$ can be defined similar to the β discussed above. For example, the value of $\beta_2$ may be defined based on image resolution or size and/or range of control lever amount for the movable object (e.g., around the pitch axis).

In general, the angular velocity of the field of view around the X (pitch) axis 608 can be expressed as a combination of the angular velocity $\omega_{X1}$ for the movable object and the angular velocity $\omega_{X2}$ for the payload relative to the movable object, such as the following:

$$\omega_X = \omega_{X1} + \omega_{X2} \quad (7)$$

In the equation (7), either $\omega_{X1}$ or $\omega_{X2}$ may be zero.

As illustrated herein, the direction of the rotation around the X (yaw) axis may depend on the sign of v−v₀. For instance, if the expected position is located above of the actual position (as illustrated in FIG. 6), then v−v₀>0, and the field of view needs to rotate in a clockwise fashion around the pitch axis 608 (e.g., pitch down) in order to bring the target to the expected position. On the other hand, if the expected position is located to below the actual position, then v−v₀<0, and the field of view needs to rotate in a counter-clockwise fashion around the pitch axis 608 (e.g., pitch up) in order to bring the target to the expected position.

As illustrated herein, the speed of rotation (e.g., absolute value of the angular velocity) depends on the distance between the expected and the actual position of the target (i.e., |v−v₀|) along a give axis (e.g., the X (pitch) axis). The further the distance is, the greater the speed of rotation. The closer the distance is, the slower the speed of rotation. When the expected position coincides with the position of the target (e.g., v=v₀), then the speed of rotation is zero and the rotation stops.

In some embodiments, the values of the angular velocities as calculated above may be constrained or otherwise modified by various constraints of the system. Such constraints may include the maximum and/or minimum speed that may be achieved by the movable object and/or the imaging device, the range of control lever amount or the maximum control lever amount or maximum sensitivity of the control system for the movable object and/or the carrier, and the like. For example, the rotation speed may be the minimum of the calculated rotation speed and the maximum speed allowed.

In some embodiments, warning indicators may be provided when the calculated angular velocities need to be modified according to the constraints described herein. Examples of such warning indicators may include textual, audio (e.g., siren or beeping sound), visual (e.g., certain color of light or flashing light), mechanical, any other suitable types of signals. Such warning indicators may be provided directly by the movable object, carrier, payload, or a component thereof. Alternatively or additionally, warning indicators may be provided by the control terminal (e.g., via the display). In the latter case, the control terminal may provide the warning indicators based on signals from the movable object.

Figure 7:
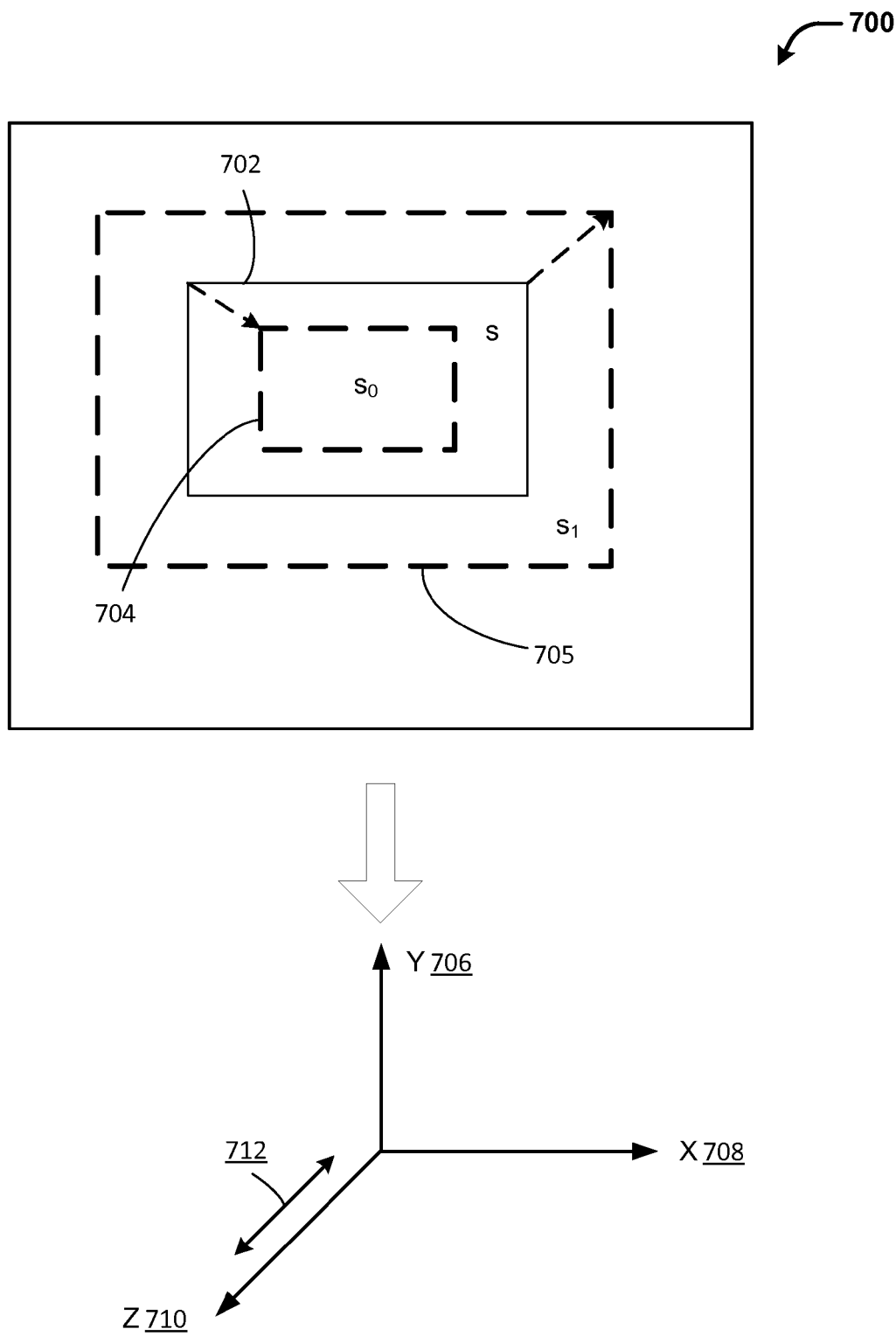
FIG. 7 illustrates an exemplary tracking method for maintaining an expected size of a target, in accordance with embodiments.

FIG. 7 illustrates an exemplary tracking method for maintaining an expected size of a target, in accordance with embodiments. An exemplary image 700 is shown such as captured by an imaging device carried by a movable object. Assume that a target 702 is captured by the image 700. The actual size of the target within the image can be s pixels (such as calculated as the product of the width of the target and the height of the target). The expected target size S may be smaller (e.g., the expected target may be represented by 704 and $S=s_0$) or larger (e.g., the expected target may be represented by 705 and $S=s_1$) than the actual size s. The expected size of the target may or may not be the same as the initial size of the target (e.g., as provided by the control terminal). Assuming that the current size s is deviated from the expected size $s_0$ or $S_1$ such that the deviation exceeds a predetermined threshold (such as a predefined $\Delta s$ pixels), then an adjustment is required to bring the target size close to the expected size $s_0$ or $s_1$.

Although display area of the image and target is shown as rectangles, it is for illustrative purposes only and not intended to be limiting. Rather, the display area of the image and/or target may be of any suitable shapes in various embodiments such as circles, ovals, polygons, and the like. Likewise, although the areas discussed herein are expressed in pixels, these are for illustrative purposes only and not intended to be limiting. In other embodiments, the areas may be expressed in any suitable units such as megapixels, $mm^2$, $cm^2$, $inch^2$, and the like.

In some embodiments, the deviation from the expected target size can be used to derive one or more linear velocities for the movable object and/or imaging device along one or more axes. For example, deviation in the target size between actual target size s and the expected target size S (e.g., $S=s_0$ or $s_1$) can be used to determine a linear velocity V for moving the movable object along a Z (roll) axis 710, as follows:

$$V=\delta^*(1-s/S), \text{ where } \delta \in \mathbb{R} \quad (8)$$

In the equation (8), $\delta$ is a constant that is defined based on the configuration of the movable object or any suitable controllable object (e.g., carrier) that may cause the field of view to move toward and/or away from the target. In some embodiments, $\delta$ is greater than zero ($\delta>0$). In other embodiments, $\delta$ may be no greater than zero ($\delta \leq 0$). In some embodiments, $\delta$ can be used to map a calculated pixel value to a corresponding control lever amount or sensitivity for controlling the linear velocity.

In general, V represents the velocity of the movable object toward or away from the target. The velocity vector points from the UAV to the target. If the actual size s of the target is smaller than the expected size S, then V>0 and the movable object moves towards the target so as to increase the size of the target as captured in the images. On the other hand, if the actual size s of the target is larger than the expected size S, then V<0 and the movable object moves away from the target so as to reduce the size of the target as captured in the images.

For instance, assume that the images have a width of W=1024 pixels and a height of H=768 pixels. Thus, the size of the images is 1024*768. Assume that the range of the control lever amount for controlling the linear velocity is (−1000, 1000). In an exemplary embodiment, $\delta=-1000$ when s/S=3 and $\delta=1000$ when s/S=⅓.

In some embodiments, the values of the velocities as calculated above may be constrained or otherwise modified by various constraints of the system. Such constraints may include the maximum and/or minimum speed that may be achieved by the movable object and/or the imaging device, the maximum sensitivity of the control system for the movable object and/or the carrier, and the like. For example, the speed for the movable object may be the minimum of the calculated speed and the maximum speed allowed.

Alternatively or additionally, the deviation between the actual target size and the expected target size can be used to derive adjustment to the operational parameters of the imaging device such as a zoom level or focal length in order to correct the deviation. Such adjustment to the imaging device may be necessary when adjustment to the movable object is infeasible or otherwise undesirable, for example, when the navigation path of the movable object is predetermined. An exemplary focal length adjustment F can be expressed as:

$$F=\gamma^*(1-s/S), \text{ where } \gamma \in \mathbb{R} \quad (9)$$

Where $\gamma$ is a constant that is defined based on the configuration of the imaging device. In some embodiments, $\gamma$ is greater than zero ($\gamma>0$). In other embodiments, $\gamma$ is no greater than zero ($\gamma \leq 0$). The value of $\gamma$ may be defined based on the types of lenses and/or imaging devices.

If the actual size s of the target is smaller than the expected size S, then F>0 and the focal length increases by |F| so as to increase the size of the target as captured in the images. On the other hand, if the actual size s of the target is larger than the expected size S, then F<0 and the focal length decreases by |F| so as to reduce the size of the target as captured in the images. For example, in an embodiment, $\gamma=10$. This means that, for example, when the actual size of the target is double the size of the expected size S, the focal length should be decreased by 10 mm accordingly (i.e., F=10*(1−2/1)=−10) and vice versa.

In some embodiments, the adjustment to the operational parameters of the imaging device such as focal length may be constrained or otherwise modified by various constraints of the system. Such constraints may include, for example, the maximum and/or minimum focal lengths that may be achieved by the imaging device. As an example, assume the focal length range is (20 mm, 58 mm). Further assume that the initial focal length is 40 mm. Then when s>S, the focal length should be decreased according to equation (9); and when s<S, the focal length should be increased according to equation (9). However, such adjustment is limited by the lower and upper bounds of the focal length range (e.g., 20 mm to 58 mm). In other words, the post-adjustment focal length should be no less than the minimum focal length (e.g., 20 mm) and no more than the maximum focal length (e.g., 58 mm).

As discussed above in FIG. 6, warning indicators may be provided when the calculated adjustment (e.g., linear velocity of movable object or focal length) is modified according to the constraints described herein. Examples of such warning indicators may include textual, audio (e.g., siren or beeping sound), visual (e.g., certain color of light or flashing light), mechanical, any other suitable types of signals. Such warning indicators may be provided directly by the movable object, carrier, payload, or a component thereof. Alternatively or additionally, warning indicators may be provided by the control terminal (e.g., via the display). In the latter case, the control terminal may provide the warning indicators based on signals from the movable object.

According to another aspect of the present invention, methods and systems are provided for tracking a target by an imaging device coupled to a movable object while the movable object is controlled to navigate by navigation commands.

Figure 8:
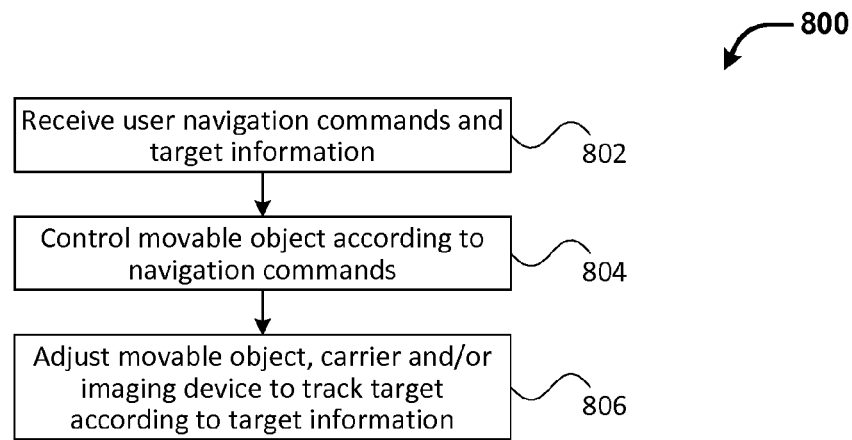
FIG. 8 illustrates another exemplary process for implementing target tracking, in accordance with embodiments.

FIG. 8 illustrates another exemplary process 800 for implementing target tracking, in accordance with embodiments. Aspects of the process 800 may be performed by one or more processors onboard a movable object as described herein such as a UAV.

The process 800 includes receiving 802 user navigation commands and target information, for example, from a remote control terminal such as described herein. The navigation commands can be used for controlling navigational parameters of the movable object such as the position, speed, orientation, or attitude of the movable object. In some cases, the navigation commands can include instructions for the movable object to execute some pre-stored navigation commands such as those related to a predetermined navigation path. The navigation commands can be used to control 804 the movable object to navigate according to a user-specified or pre-stored navigation path.

The target information can include initial target information (e.g., position and/or size) of a particular target such as selected by a user operating a control terminal and/or target type information such as color, texture, pattern, size, shape, dimension, and the like.

Target information can also include expected target information (e.g., position and/or size). The expected target information specifies the characteristics that the target being tracked is expected to meet in the images captured by the imaging device. The expected target information may be used to adjust the movable object, carrier and/or imaging device so that the target being tracked maintains parameters specified by the expected target information. For example, the target may be tracked so as to maintain an expected position and/or size within one or more images captured by the imaging device. For example, the expected position of the tracked target may be near the center of the image or off-center. The expected size of the tracked target may be around a certain number of pixels (e.g., the initial target size). The expected target information may or may not be the same as the initial target information. In various embodiments, expected target information may or may not be provided by the control terminal. For example, expected target information may be hardcoded in the control logic executed by a processing unit onboard the movable object, stored in a data store local and/or remote to the movable object, or obtained from other suitable sources.

In some embodiments, the target information (including specific target information and target type information) may be generated at least in part on user input at the control terminal 112. Additionally or alternatively, the target information may be generated based on data from other sources. For example, target type information may be derived based on previous images and/or extracted from local or remote data stores. Such target type information may be selected by the user and/or provided automatically by default to the movable object.

The target information may be used to adjust 806 the movable object, carrier, and/or imaging device to track the target according to the target information. The tracking and any other related data processing may be performed automatically by one or more processors onboard the movable object, one or more processors remote from the movable object, or any suitable combination thereof. In some embodiments, the target information can be used to identify, by the movable object, the target to be tracked. Such identification of the target may be performed based on the initial target information including the specific characteristics of a particular target (e.g., based on provided coordinates of the target within an image captured by the movable object), or general target type information included in the target information.

Once a target is identified, expected target information (as part of the target information) can be used to detect a deviation from expected characteristics of the target such as expected position and/or size. The deviation may be detected by comparing the target's characteristics (e.g., positions and/or sizes) within a series of images captured by the movable objects to determine whether the characteristics change across the images. The series of images may be captured by the movable object at different points in time. A change in position of the target may be detected by comparing coordinates of the center of the target within an image to the coordinates of the expected target position. A change in size of the target may be detected by comparing the size of the area (e.g., in pixels) covered by the target with the expected target size.

Based at least in part on the detected deviation, control signals may be generated automatically (e.g., by one or more processors onboard the movable object) that pertains to the movable object, the carrier, the imaging device, and/or any suitable component thereof. The control signals can be used to substantially correct the detected deviation. In some embodiments, the adjustment may be used to substantially maintain one or more expected target characteristics (e.g., target position and/or size) within the images captured by the movable object while the movable object navigates according to user provided navigation commands. The adjustment may be performed in substantially real time as the movable object is executing user-provided navigation commands or pre-stored navigation paths and/or as the imaging device is capturing one or more images. In some embodiments, the adjustment may be generated based on other information such as sensing data acquired by one or more sensors onboard the movable object (e.g., proximity sensor, or GPS sensor). For example, position information of the target being tracked may be obtained by a proximity sensor and/or provided by the target itself (e.g., GPS location). Such position information may be used, in addition to the detected deviation, to generate the adjustment control signals to track the target.

In some embodiments, when the movable object is navigating according user provided navigation commands or predetermined navigation paths, the adjustment for target tracking is limited to the carrier and/or the imaging device without affecting the state (e.g., attitude, position, orientation, or speed) of the movable object itself. This may be because it is infeasible or otherwise undesirable to adjust the movable object while it executing user provided navigation commands or pre-stored navigation paths. For example, such adjustment may cause the carrier to move the imaging device relative to the movable object such as around or along one, two, or more rotational axes to compensate for deviation from the expected position of the target. Additionally or alternatively, the adjustment may cause adjustment to the focal length or zoom, focus, or other operational parameters of the imaging device to compensate for deviation from the expected size of the target. Discussion of exemplary methods for such adjustments is provided in connection with FIGS. 6-7. In other embodiments, the adjustment may also involve adjustment to the movable object.

Figure 9:
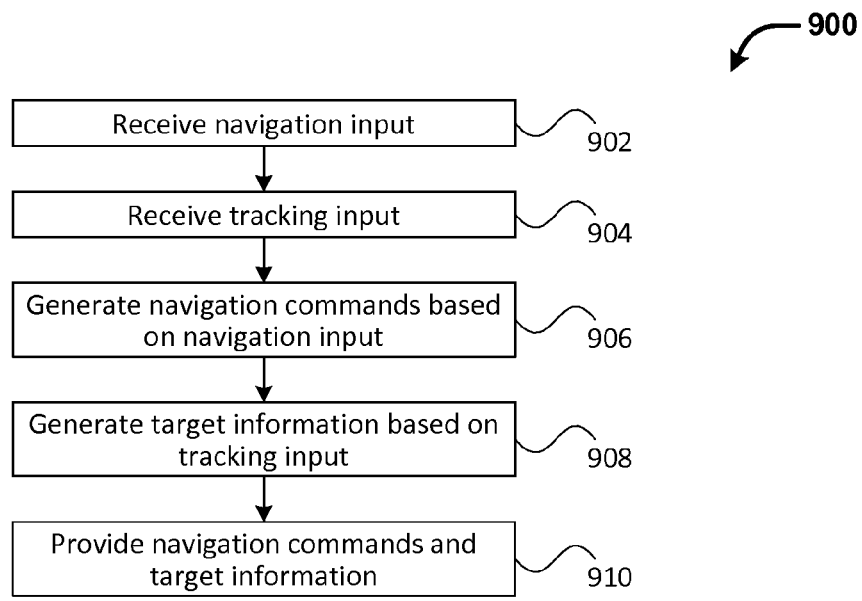
FIG. 9 illustrates an exemplary process for controlling a movable object to navigate and track, in accordance with embodiments.

According to another aspect of the present invention, methods and systems are provided for controlling a movable object to navigate according to one or more navigation commands while tracking a target. FIG. 9 illustrates an exemplary process 900 for controlling a movable object to navigate and track, in accordance with embodiments. Aspects of the process 900 may be performed by a control terminal such as described herein. For example, the control terminal can be a handheld or wearable device. For example, the control terminal can include a smartphone, tablet, laptop, computer, glasses, gloves, helmet, microphone, or suitable combinations thereof.

The process 900 includes receiving 902 user input related to navigation or navigation input. Such navigation input may be used to generate navigation commands for controlling the movable object or a component thereof such as described in connection with FIG. 8. The navigation input may be provided via a user interface provided by the control terminal, such as a keyboard, mouse, joystick, touchscreen, buttons, microphone, webcam, or the like. Any suitable user input can be used to interact with the control device, such as manually entered commands, voice control, gesture control, or position control (e.g., via a movement, orientation and/or attitude of the control device).

The process 900 also includes receiving 904 user input related to tracking or tracking input. Such tracking input may be used to generate target information related to a target or a type of targets to be tracked by the movable object such as described herein. The tracking input may be provided using the same or different interface as that for providing the navigation input. For example, the tracking input may be provided via a touchscreen while the navigation input may be provided via a joystick or an inertial sensor configured to detect a change in attitude of the control terminal (e.g., rotating the control terminal around a rotational axis). As another example, both the navigation input and the tracking input may be provide via the same user interface such via a touchscreen, keyboard, mouse, or joystick.

In some embodiments, the navigation input, or the tracking input may each be provide via two or more user interfaces. For example, navigation input may be provided via both joystick and touchscreen. As another example, tracking input may be provided via touchscreen, joystick, and keyboard.

The navigation input can be used to generate 906 navigation commands for the movable object. For example, mechanical signals resulting from a user's movement of a joystick along or around one or more predefined axes may be translated into navigation commands for moving the movable object along the corresponding axes (e.g., pitch, yaw, or roll). As another example, the user's interaction with a graphical user interface (e.g., movement of an icon representing an orientation or position of the movable object) may be converted to the corresponding navigation commands. As yet another example, a user's movement of the control terminal along or around one or more predefined axes may be detected by one or more inertial sensors and used to generate navigation commands for moving the movable object along the corresponding axes (e.g., pitch, yaw, or roll). In addition to navigation input, the navigation commands may be generated based on other data such as sensing data provided by the movable object.

The tracking input can be used to generate 908 target information that can be used by the movable object to track one or more targets. The target information may include initial target information and/or expected target information such as described herein. Initial target information can include specific characteristics of a particular target (e.g., based on provided coordinates of the target within an image captured by the movable object), or general characteristics of a type of targets (e.g., based on provided color and/or texture of the target(s) to be tracked). Initial target information may be used to identify the target to be tracked, for example, from one or more images. The expected information can be used to detect a deviation from expected characteristics of the target such as expected position and/or size. In some embodiments, the expected information may be optional and some or all of the initial information may be used as the expected information.

The process 900 also includes receiving user input and generation commands related to control of the carrier and/or imaging devices. Examples of such control may include changing an attitude and/or orientation of the imaging device via the carrier, adjusting one or more operational parameters (e.g., zoom) of the imaging device, and the like.

Figure 10:
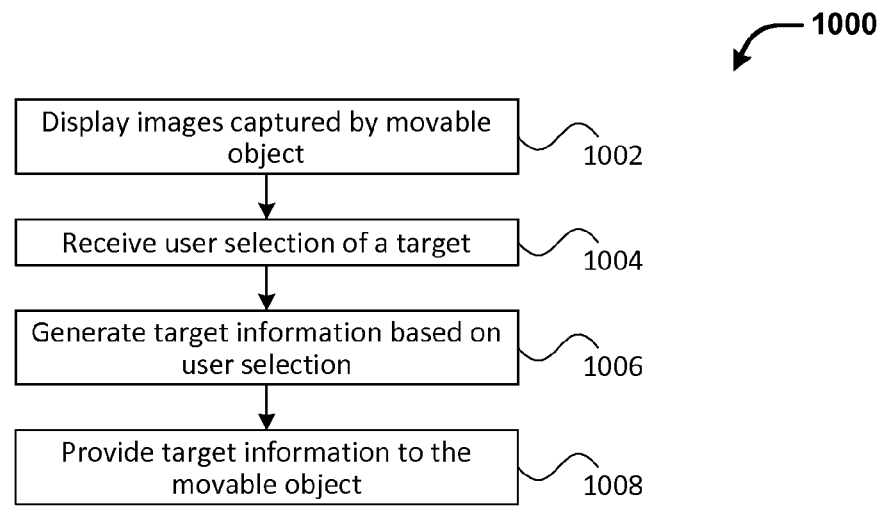
FIG. 10 illustrates an exemplary process for selecting a target, in accordance with embodiments.

In some embodiments, such as described in further detail in FIG. 10, the coordinates, size, and other characteristics of a target may be selected by the user in a graphical user interface and used to generate initial and/or expected target information.

In some embodiments, the generated navigation commands and/or target information may be provided 910 to the movable object, such as via a communication system of a control terminal. Such commands and information may be provided while the movable object is in use (e.g., moving or otherwise operating in the intended environment). In some embodiments, the navigation commands and target information may be provided directly from a control terminal to a movable object. In some other embodiments, navigation commands and target information may be provided to one or more intermediate entities (e.g., relay stations or other movable objects) before reaching the movable object.

In some embodiments, all of the steps of process 900 are implemented by the same entity such as a single control terminal. In some other cases, the steps of process 900 are implemented by two or more separate entities. Such separate entities may communicate with each other, for example, via wired or wireless connections. For example, the receiving 902 of navigation input and generation 906 of navigation commands may be implemented by first device while the receiving 904 of tracking input and generation 908 of target information may be implemented by a second device. The second device may transmit the target information to the first device, which may be configured to transmit both navigation commands and target information to the movable object. As another example, the receiving steps 902 and 904 may be performed by one device, while the generation steps 906 and 908 may be performed by another device.

According to some other aspects of the present invention, an interactive user interface is provided for selecting and viewing, in substantially real time, targets tracked by a movable object described herein such as a UAV. Such a user interface may be provided by a control terminal such as described herein. FIG. 10 illustrates an exemplary process 1000 for selecting a target, in accordance with embodiments. Aspects of the process 1000 may be performed by a control terminal such as described herein.

The process 1000 includes displaying 1002 one or more images captured by the movable objects. The images may be captured by an imaging device coupled to the movable object via a carrier as described herein. The carrier may or may not permit the imaging device to move relative to the movable object. The imaging device may alternatively be coupled directly to the movable object without a carrier. The images may be transmitted to a control terminal from the movable object or directly from the imaging device. The images thus received by the control terminal may be decompressed or otherwise processed before being displayed on a user interface associated with the control terminal. The user interface may be provided by a display that is integral to the control terminal. Alternatively, the display may be separate from but operatively connected to the control terminal. The images thus displayed may be static (e.g., still images) or dynamic (e.g., videos).

In some embodiments, the images may be displayed or streamed in substantially real time as the images are received from the movable object and/or the imaging device. In some embodiments, the images are transmitted from the movable object and/or imaging device in substantially real time as the images are captured by the imaging device. In other cases, there may be some delay between the capture and/or transmission of the images and the display of the images.

In some embodiments, the process 1000 includes receiving 1004 a user selection of a target from within at least one of the images being displayed. The user may select the target via the same user interface that displays the images. For example, in some embodiments, the user selection of the target is achieved by a user selecting an area of the at least one of the one or more images being displayed on the display, the selected area corresponding to the target. For example, the user may select the target by directly touching a touchscreen using a finger or stylus. As another example, the user may select the target using a mouse, joystick, gesture, or voice command. In yet another embodiment, the user may select target via a wearable device such as a helmet, virtual reality goggle, and the like. Selection of the target area can involve any suitable motion including touching or tapping, swiping, circling, clicking, or the like associated with any suitable input methods such as described herein.

In some embodiments, the selected target is displayed with a selection indicator in the images to indicate that is selected by the user. The selection indicator may be represented by a circle, checkmark, arrow, polygon, or any other suitably shaped object graphical object of any suitable color or pattern.

The user-selected target can be used to generate 1006 target information. For example, the coordinates and pixel size of the selected target within an image can be used to as or used to generate initial information for the target. Alternatively or additionally, characteristics associated with the selected target can be used to generate at least some of the target type information. In some embodiments, the remaining target type information may be provided based on other user input. For example, the target type information may include the color and texture of the target to be tracked. The color of the target type information may be extracted from a particular target selected by the user; whereas the texture of the target may be manually entered by the user, or selected from a plurality of predetermined patterns.

In some embodiments, a user is allowed to select between a manual tracking mode and an automatic tracking mode. When the manual tracking mode is selected, a user can specify a specific target to track such as from an image being displayed by the control terminal. On the other hand, when the automatic tracking mode is selected, the user can specify the target type information rather than a specific target to be tracked. The movable object can then use the target type information to automatically identify the target to be tracked and subsequently track the identified target.

Optionally, information about the selected target may be used to generate expected target information. For example, the initial target information may be the same the expected target information. As another example, the expected target information may be expressed with reference to the initial target information. For example, the expected target position may be expressed using an offset from the initial target position. Similarly, the expected target size may be expressed as a ratio between the expected target size and the initial target size (e.g., the expected target size may be twice the size of the initial target size). In various embodiments, the target information may be generated based on a target selected by a user, data obtained using other user input methods (e.g., data entry from keyboard) and/or data from non-user sources (e.g., local or remote data store or other suitable computing systems).

The target information can be provided 1008 to the movable object for tracking purposes. For example, initial target information and/or target type information can be used by one or more processors on the movable object to identify the target to be tracked. The expected target information can be used by the movable object to substantially maintain predetermined position, size, and other characteristics of the target during the tracking process.

In various embodiments, any portion of the target information used to control the tracking process can be provided by users and the rest by the tracking system. For example, in an embodiment, initial target information is provided by a user via user selection of a concrete target whereas the expected target information is provided by the system by default. In another embodiment, a user may provide the target type information whereas the system automatically determines the target based on the target type information and tracks the target using user-specified or system-provided expected target information. In yet another embodiment, a user may supply all the target information including the initial and expected target information and the system simply tracks the specified target accordingly.

The specific allocation the tracking control between the users and the tracking system can vary depending on a variety of factors such as the surroundings of the movable object, speed or altitude of the movable object, user preferences, and computing resources (e.g., CPU or memory) available onboard and/or off-board the movable object, the like. For example, relatively more control may be allocated to the user when the movable object is navigating in a relatively complex environment (e.g., with numerous buildings or obstacles or indoor) than when the movable object is navigating in a relatively simple environment (e.g., wide open space or outdoor). As another example, more control may be allocated to the user when the movable object is at a lower altitude than when the movable object is at a higher altitude. As yet another example, more control may be allocated to the movable object if the movable object is equipped with a high-speed processor adapted to perform complex computations relatively quickly.

Figure 11:
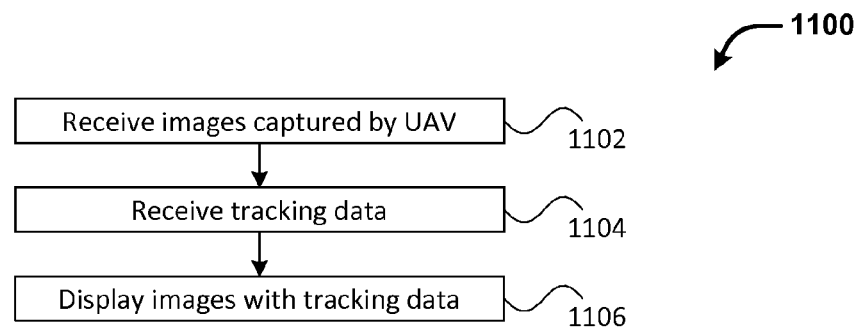
FIG. 11 illustrates an exemplary process for viewing a tracked target, in accordance with embodiments.

FIG. 11 illustrates an exemplary process 1100 for viewing a tracked target, in accordance with embodiments. Aspects of the process 1100 may be performed by the same or a different control terminal for implementing the process 1000.

The process 1100 includes receiving 1102 images captured by a movable object such as described herein (e.g., a UAV). The images may be captured by an imaging device coupled to the movable object (e.g., via a carrier). In some cases, the images may be received directly from the imaging device that captured the images. The images may be received by a control terminal such as described herein. In some embodiments, images may be received after target information such as described herein has been provided to the movable object. The target information may have been provided according to a process similar to the process 900 or 1000 such as discussed in FIG. 9 or 10. The movable object may be configured to track the target as identified and/or specified by the target information according to a process similar to the process 400 discussed in FIG. 4. As such, at least some of the images received may include the target being tracked.

The process 1100 also includes receiving 1104 tracking data or information used to indicate characteristics of one or more target tracked by the movable object. Examples of tracking information may include relative or absolute coordinates and/or size of the target within one or more images received from the movable object, changes or offsets of the target between consecutive image frames, GPS coordinates, or other positional information of the target, and the like.

The received images may be displayed 1106 with tracking data to show the target that is being tracked by the movable object. For example, the tracking data may be used to determine the location and/or size of the target being tracked in some or all of the images. Based on this information, a tracking indicator such as similar to the selection indicator discussed in FIG. 10 may be generated and displayed. For example, given the target location within a given image, the image may be displayed with a tracking indicator at approximately the target location and of a size large enough to cover the target or a portion thereof. Examples of a tracking indicator may include a box, a circle, an oval, or a graphical object of any other suitable shape, color, or size.

Advantageously, displaying tracked target with such tracking indicator helps the users to visually identify the target being tracked while viewing the images that are captured by and/or transmitted from the movable object in substantially real time. In other words, the users may view the targets substantially concurrently as they are being tracked by the movable object. In other embodiments, the display may be provided after some delay.

In some embodiments, while the viewing the target being tracked by the movable object, the user may select the target being tracked (e.g., as indicated by a tracking indicator) to view more detailed information with respect to the target. The user may also perform other operations with respect to the target or any other objects being displayed by interacting with the user interface where the images are displayed. For example, the user may zoom in or out by moving fingers across a touchscreen.

Some of such user operations may be converted to tracking commands and sent to the movable object. For example, user's zoom in/out operations as described above may be translated to suitable zoom in/out commands for the imaging device and/or control commands to move the movable object closer to or farther away from the target. Alternatively or additionally, the user may elect to switch to a different target for tracking. Such a switch may be performed dynamically as the user selects the different target. The target information related to the different target may be dynamically provided to the movable object, for example, in a manner similar to that described in FIG. 10. In response, the movable object may then dynamically switch to tracking the different target using the methods described herein, for example, in substantially real-time.

Figure 12:
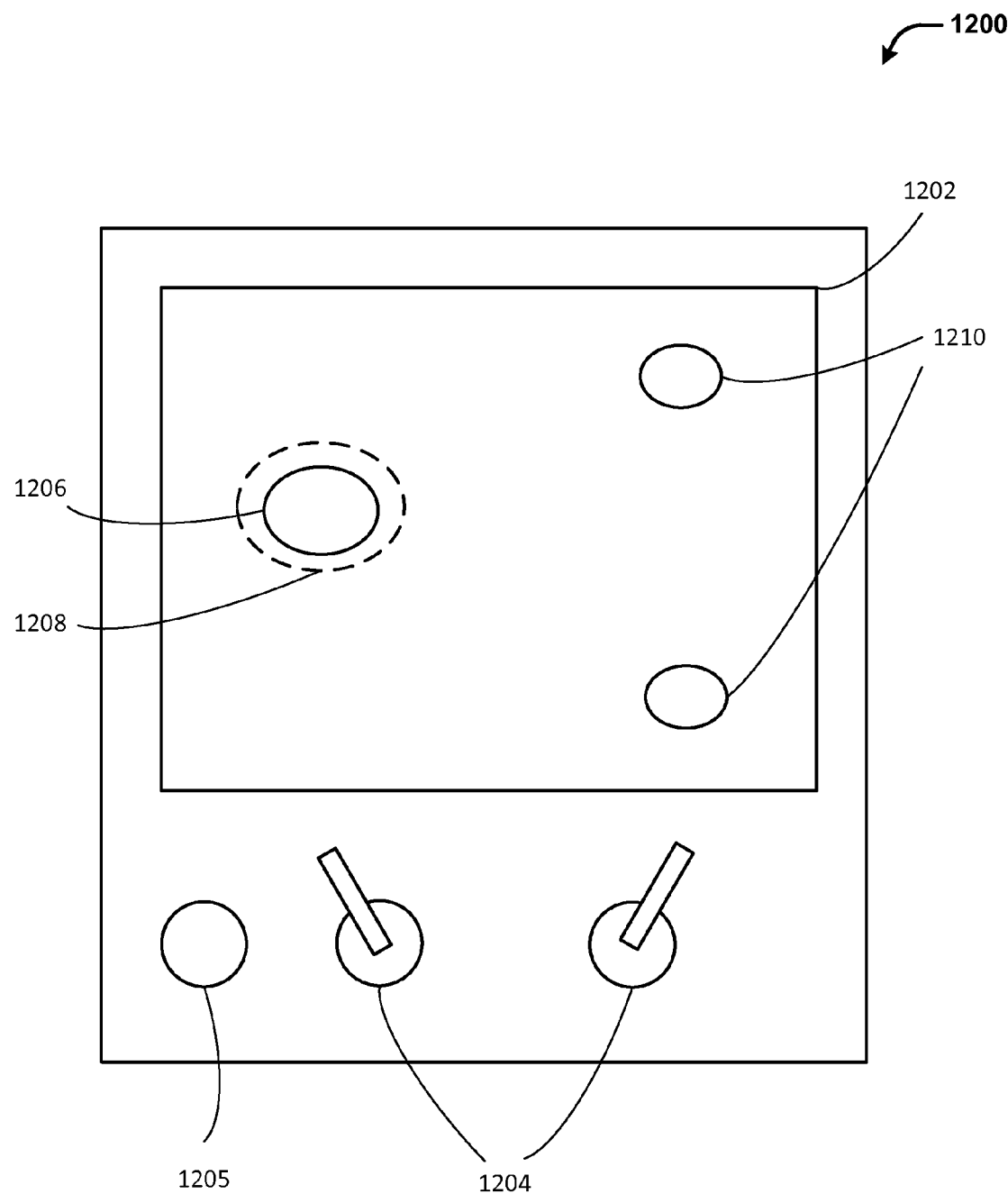
FIG. 12 illustrates an exemplary control terminal for controlling a movable object, in accordance with embodiments.

FIG. 12 illustrates an exemplary control terminal 1200 for controlling a movable object, in accordance with embodiments. The control terminal 1200 includes a display area 1202 for displaying sensing data such as image data captured by an imaging device or image sensor coupled to a movable object such as a UAV. The image data may include images of one or more objects 1210 and 1206 as captured by an imaging device or image sensor onboard the movable object. One of the one or more objects can include a target 1206 that is being tracked by the movable object. The target may be displayed with an indicator 1208. The indicator 1208 may include a selection indicator such as discussed in FIG. 10 to indicate that the target is selected by the user to be tracked by the movable object, and/or a tracking indicator such as discussed in FIG. 11 to indicate that the target is being tracked by the movable object. The indicator 1208 may be configured to move with the target as its positions change across different images.

The control terminal 1200 can also include one or more input devices 1204 and 1205 for receiving user input. Such input device may include joysticks 1204, buttons or switches 1205, keyboard, mouse, touchscreen or any suitable mechanisms. For example, one or more buttons or switches 1205 may be used to switch between different input modes such as navigation input mode, target input mode, and the like. The switches 1205 may also be used to select between a manual tracking mode and an automatic tracking mode as described herein. The functionalities associated with some of the input devices such as the joysticks 1204 may change depending on the selected input mode. For example, such input devices may be used to provide navigation input when the navigation input mode is selected and target information when the target input mode is selected. As another example, the input devices may be used to select specific target when the manual tracking mode is selected and to provide target type information when the auto tracking mode is selected.

Figure 13A:
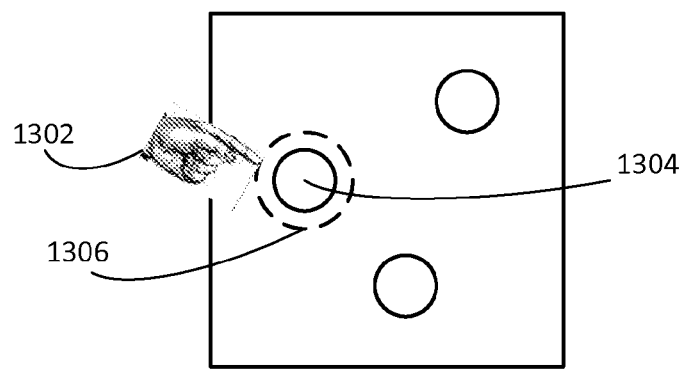
FIGS. 13A-C illustrate exemplary methods for selecting a target using a user interface, in accordance with some embodiments.
Figure 13B:
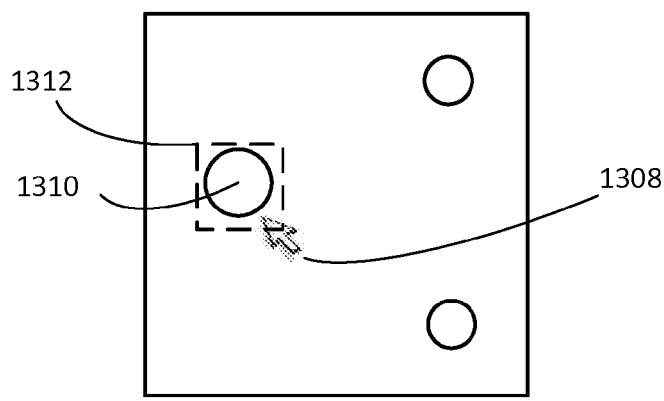
Figure 13C:
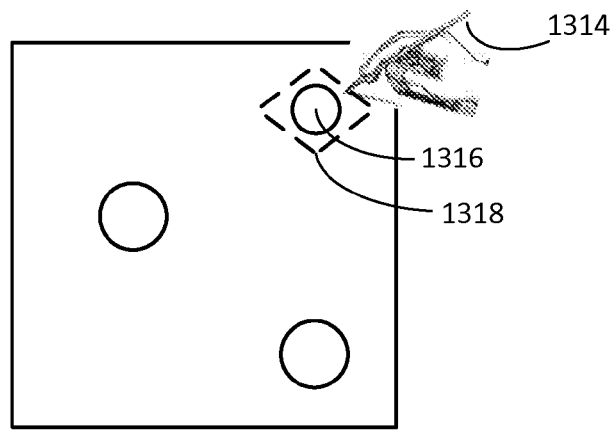

FIGS. 13A-C illustrate exemplary methods for selecting a target using a user interface, in accordance with some embodiments. In an embodiment, such as illustrated in FIG. 13A, the user interface can enable a user to select a target 1304 by touching, using a hand 1302, an area of a touchscreen that corresponds to the target. The selected target 1304 may be indicated by a selection indicator 1306, such as a circle surrounding the selected target 1304. In another embodiment, such as illustrated in FIG. 13B, the user interface can enable a user to select a target 1310 using a mouse 1308, for example, by clicking on an area of a screen that corresponds to the target. The selected target 1310 may be indicated with a selection indicator 1312. In yet another embodiment, such as illustrated in FIG. 13C, the user interface can enable a user to select a target 1316 using a stylus 1314, for example, by tapping on an area of a screen that corresponds to the target. The selected target 1316 may be indicated with a selection indicator 1318. In various embodiments, the selection indicator may be of any arbitrary shape such as a circle 1306, rectangle 1312, or diamond 1318.

The systems and methods described herein can be implemented by and/or applied to a wide variety of movable objects. The systems, devices, and methods described herein can be applied to a wide variety of movable objects. As previously mentioned, any description herein of an aerial vehicle may apply to and be used for any movable object. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include primates, avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 14:
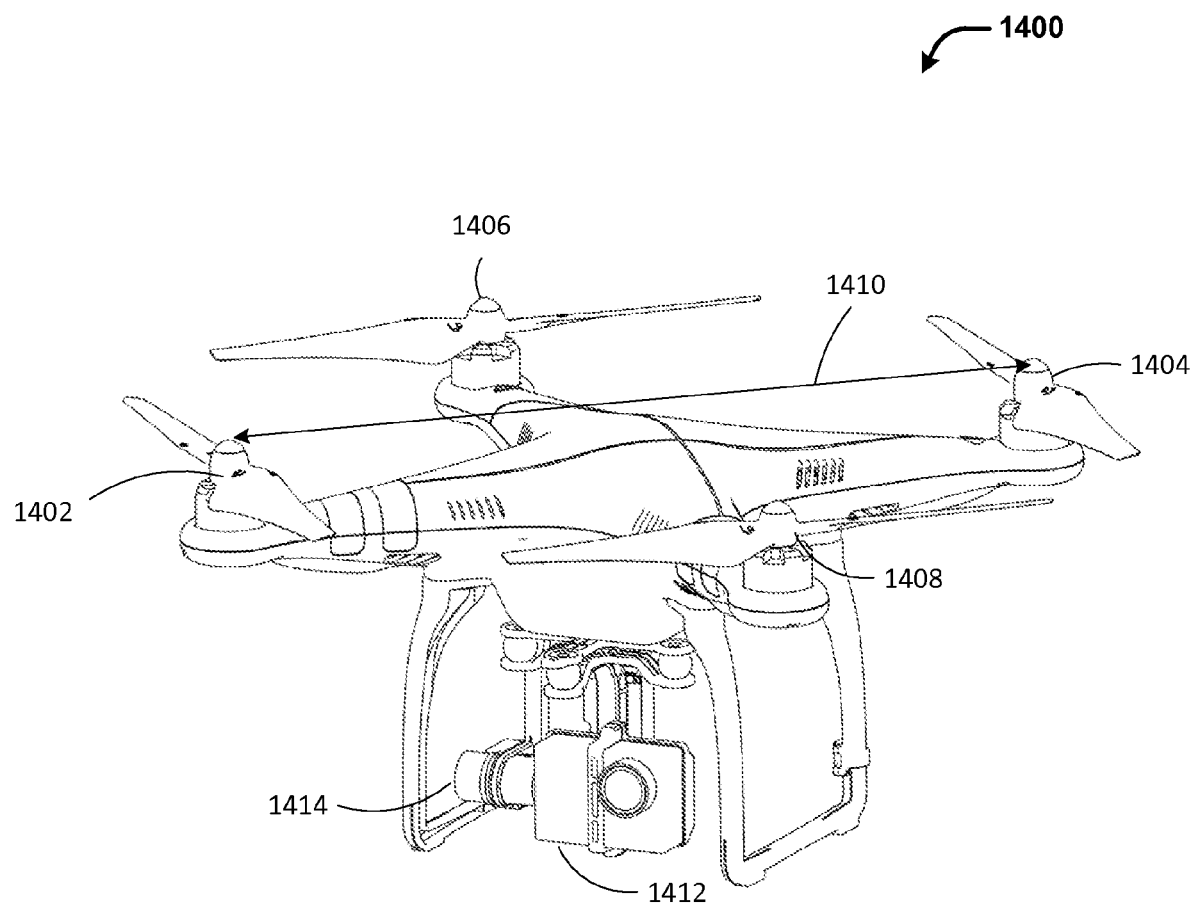
FIG. 14 illustrates a UAV, in accordance with embodiments.

FIG. 14 illustrates a UAV 1400, in accordance with embodiments of the present invention. The UAV may be an example of a movable object as described herein. The UAV 1400 can include a propulsion system having four rotors 1402, 1404, 1406, and 1408. Any number of rotors may be provided (e.g., one, two, three, four, five, six, or more). The rotors can be embodiments of the self-tightening rotors described elsewhere herein. The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1410. For example, the length 1410 can be less than or equal to 2 m, or less than equal to 5 m. In some embodiments, the length 1410 can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for an movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload 1412. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier 1414. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the position of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 15:
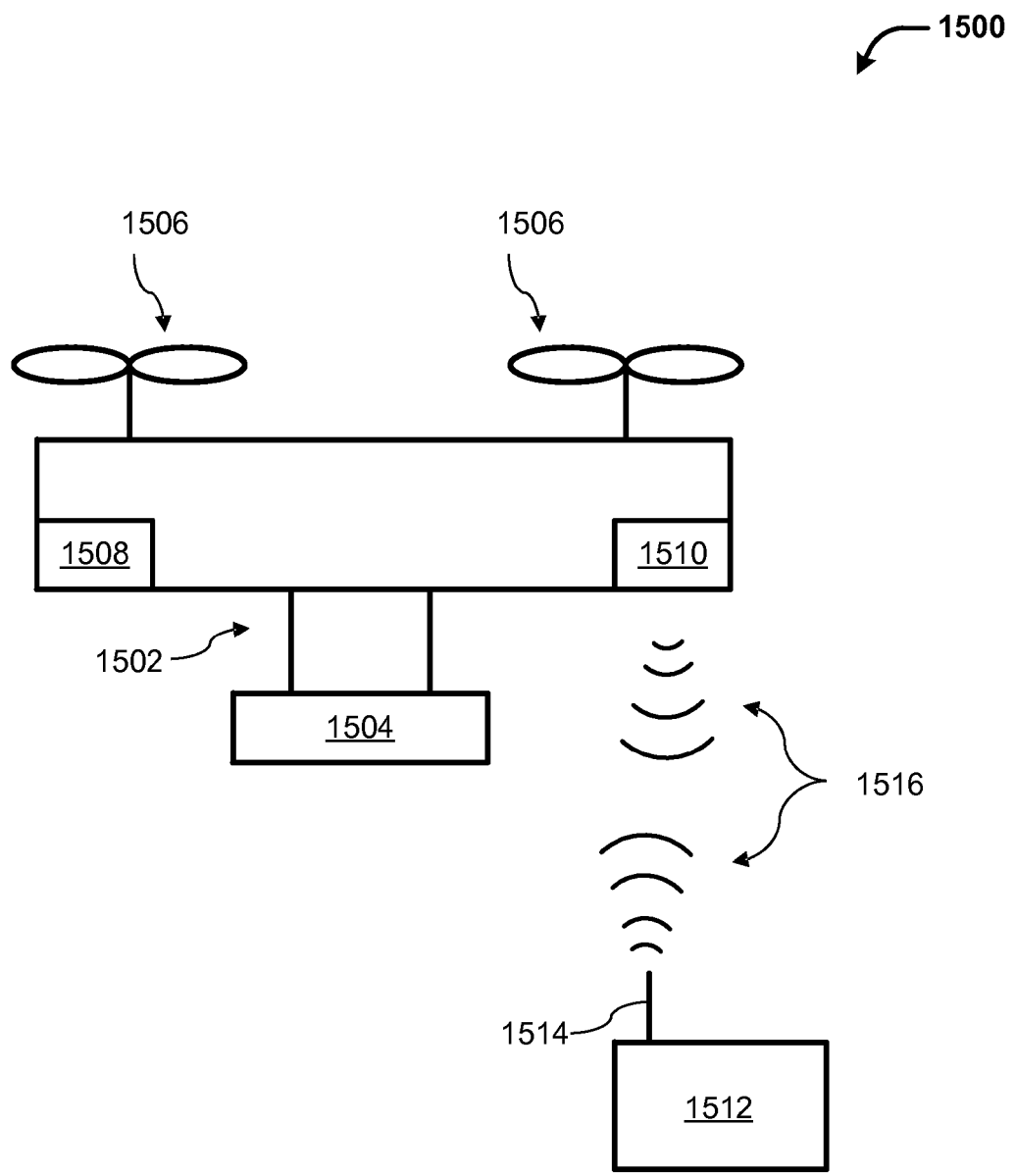
FIG. 15 illustrates a movable object including a carrier and a payload, in accordance with embodiments.

FIG. 15 illustrates a movable object 1500 including a carrier 1502 and a payload 1504, in accordance with embodiments. Although the movable object 1500 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., a UAV). In some instances, the payload 1504 may be provided on the movable object 1500 without requiring the carrier 1502. The movable object 1500 may include propulsion mechanisms 1506, a sensing system 1508, and a communication system 1510.

The propulsion mechanisms 1506 can include one or more of rotors, propellers, blades, engines, motors, wheels, axles, magnets, or nozzles, as previously described. For example, the propulsion mechanisms 1506 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1506 can be mounted on the movable object 1500 using any suitable means, such as a support element (e.g., a drive shaft) as described elsewhere herein. The propulsion mechanisms 1506 can be mounted on any suitable portion of the movable object 1500, such on the top, bottom, front, back, sides, or suitable combinations thereof.

In some embodiments, the propulsion mechanisms 1506 can enable the movable object 1500 to take off vertically from a surface or land vertically on a surface without requiring any horizontal movement of the movable object 1500 (e.g., without traveling down a runway). Optionally, the propulsion mechanisms 1506 can be operable to permit the movable object 1500 to hover in the air at a specified position and/or orientation. One or more of the propulsion mechanism 1500 may be controlled independently of the other propulsion mechanisms. Alternatively, the propulsion mechanisms 1500 can be configured to be controlled simultaneously. For example, the movable object 1500 can have multiple horizontally oriented rotors that can provide lift and/or thrust to the movable object. The multiple horizontally oriented rotors can be actuated to provide vertical takeoff, vertical landing, and hovering capabilities to the movable object 1500. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1500 (e.g., with respect to up to three degrees of translation and up to three degrees of rotation).

The sensing system 1508 can include one or more sensors that may sense the spatial disposition, velocity, and/or acceleration of the movable object 1500 (e.g., with respect to up to three degrees of translation and up to three degrees of rotation). The one or more sensors can include any of the sensors previously described herein, including GPS sensors, motion sensors, inertial sensors, proximity sensors, or image sensors. The sensing data provided by the sensing system 1508 can be used to control the spatial disposition, velocity, and/or orientation of the movable object 1500 (e.g., using a suitable processing unit and/or control module, as described below). Alternatively, the sensing system 1508 can be used to provide data regarding the environment surrounding the movable object, such as weather conditions, proximity to potential obstacles, location of geographical features, location of man-made structures, and the like.

The communication system 1510 enables communication with terminal 1512 having a communication system 1514 via wireless signals 1516. The communication systems 1510, 1514 may include any number of transmitters, receivers, and/or transceivers suitable for wireless communication. The communication may be one-way communication, such that data can be transmitted in only one direction. For example, one-way communication may involve only the movable object 1500 transmitting data to the terminal 1512, or vice-versa. The data may be transmitted from one or more transmitters of the communication system 1510 to one or more receivers of the communication system 1512, or vice-versa. Alternatively, the communication may be two-way communication, such that data can be transmitted in both directions between the movable object 1500 and the terminal 1512. The two-way communication can involve transmitting data from one or more transmitters of the communication system 1510 to one or more receivers of the communication system 1514, and vice-versa.

In some embodiments, the terminal 1512 can provide control data to one or more of the movable object 1500, carrier 1502, and payload 1504 and receive information from one or more of the movable object 1500, carrier 1502, and payload 1504 (e.g., position and/or motion information of the movable object, carrier or payload; data sensed by the payload such as image data captured by a payload camera). In some instances, control data from the terminal may include instructions for relative positions, movements, actuations, or controls of the movable object, carrier, and/or payload. For example, the control data may result in a modification of the location and/or orientation of the movable object (e.g., via control of the propulsion mechanisms 1506), or a movement of the payload with respect to the movable object (e.g., via control of the carrier 1502). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1508 or of the payload 1504). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier, and/or payload. Such information from a payload may include data captured by the payload or a sensed state of the payload. The control data provided transmitted by the terminal 1512 can be configured to control a state of one or more of the movable object 1500, carrier 1502, or payload 1504. Alternatively or in combination, the carrier 1502 and payload 1504 can also each include a communication module configured to communicate with terminal 1512, such that the terminal can communicate with and control each of the movable object 1500, carrier 1502, and payload 1504 independently.

In some embodiments, the movable object 1500 can be configured to communicate with another remote device in addition to the terminal 1512, or instead of the terminal 1512. The terminal 1512 may also be configured to communicate with another remote device as well as the movable object 1500. For example, the movable object 1500 and/or terminal 1512 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1500, receive data from the movable object 1500, transmit data to the terminal 1512, and/or receive data from the terminal 1512. Optionally, the remote device can be connected to the Internet or other telecommunications network, such that data received from the movable object 1500 and/or terminal 1512 can be uploaded to a website or server.

Figure 16:
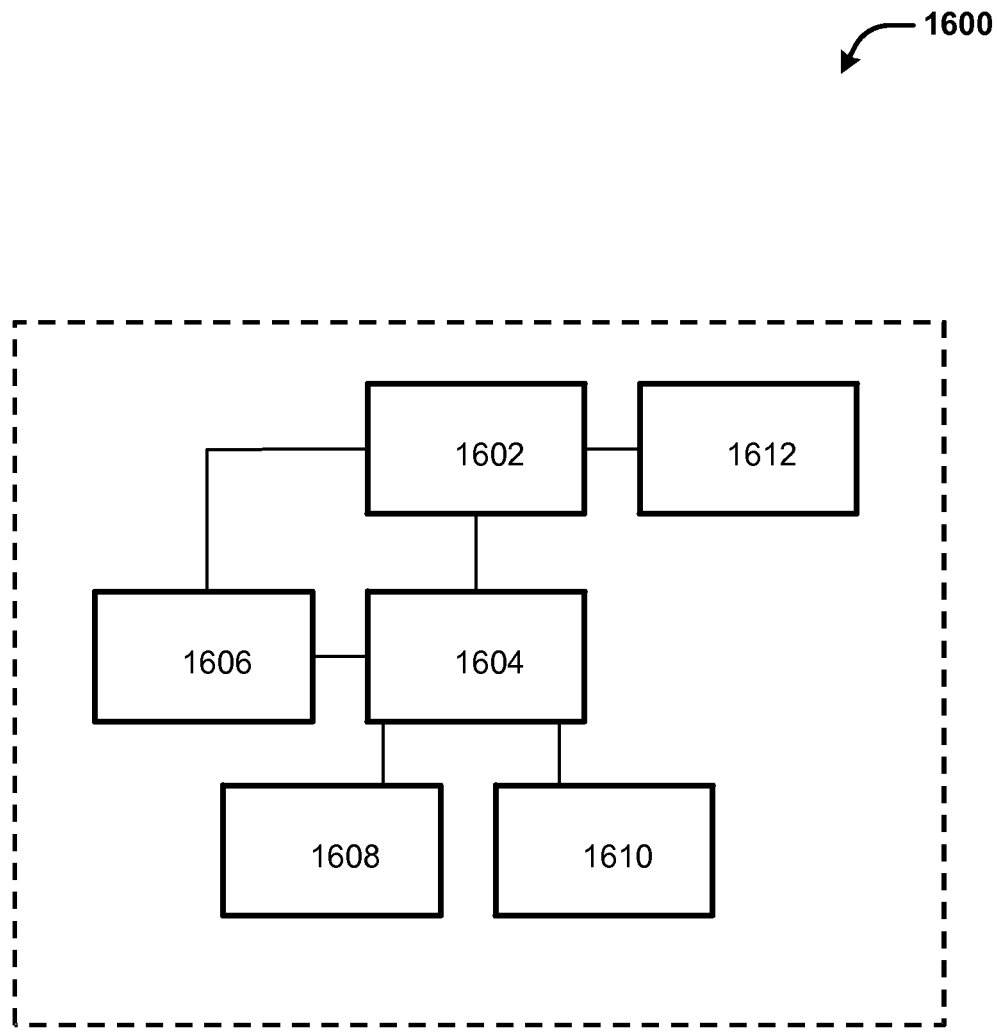
FIG. 16 illustrates an exemplary system for tracking a movable object, in accordance with embodiments.

FIG. 16 illustrates an exemplary system 1600 for tracking a target, in accordance with embodiments. The system 1600 can be used in combination with any suitable embodiment of the systems, devices, and methods disclosed herein. For example, the system 1600 may implemented or carried by a movable object. The system 1600 can include a sensing module 1602, processing unit 1604, non-transitory computer readable medium 1606, control module 1608, and communication module 1610.

The sensing module 1602 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1602 can be operatively coupled to a processing unit 1604 having a plurality of processors. In some embodiments, the sensing module can be operatively coupled to a transmission module 1612 (e.g., a Wi-Fi image transmission module) configured to directly transmit sensing data to a suitable external device or system. For example, the transmission module 1612 can be used to transmit images captured by a camera of the sensing module 1602 to a remote terminal.

The processing unit 1604 can have one or more processors, such as a programmable processor (e.g., a central processing unit (CPU)). For example, the processing unit 1604 may include a field programmable gate array (FPGA) and/or one or more ARM processors. The processing unit 1604 can be operatively coupled to a non-transitory computer readable medium 1606. The non-transitory computer readable medium 1606 can store logic, code, and/or program instructions executable by the processing unit 1604 for performing one or more steps. The non-transitory computer readable medium can include one or more memory units (e.g., removable media or external storage such as an SD card or random access memory (RAM)). In some embodiments, data from the sensing module 1602 can be directly conveyed to and stored within the memory units of the non-transitory computer readable medium 1606. The memory units of the non-transitory computer readable medium 1606 can store logic, code and/or program instructions executable by the processing unit 1604 to perform any suitable embodiment of the methods described herein. For example, the processing unit 1604 can be configured to execute instructions causing one or more processors of the processing unit 1604 to perform the tracking functionalities discussed herein. The memory units can store sensing data from the sensing module to be processed by the processing unit 1604. In some embodiments, the memory units of the non-transitory computer readable medium 1606 can be used to store the processing results produced by the processing unit 1604.

In some embodiments, the processing unit 1604 can be operatively coupled to a control module 1608 configured to control a state of the movable object. For example, the control module 1608 can be configured to control the propulsion mechanisms of the movable object to adjust the spatial disposition, velocity, and/or acceleration of the movable object with respect to six degrees of freedom. Alternatively or in combination, the control module 1608 can control one or more of a state of a carrier, payload, or sensing module.

The processing unit 1604 can be operatively coupled to a communication module 1610 configured to transmit and/or receive data from one or more external devices (e.g., a terminal, display device, or other remote controller). Any suitable means of communication can be used, such as wired communication or wireless communication. For example, the communication module 1610 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1610 can transmit and/or receive one or more of sensing data from the sensing module 1602, and/or processing results produced by the processing unit 1604, predetermined control data or user commands from a terminal or remote controller, and the like.

The components of the system 1600 can be arranged in any suitable configuration. For example, one or more of the components of the system 1600 can be located on the movable object, carrier, payload, terminal, sensing system, or an additional external device in communication with one or more of the above. Additionally, although FIG. 16 depicts a single processing unit 1604 and a single non-transitory computer readable medium 1606, one of skill in the art would appreciate that this is not intended to be limiting, and that the system 1600 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1600 can occur at one or more of the aforementioned locations.

Figure 17:
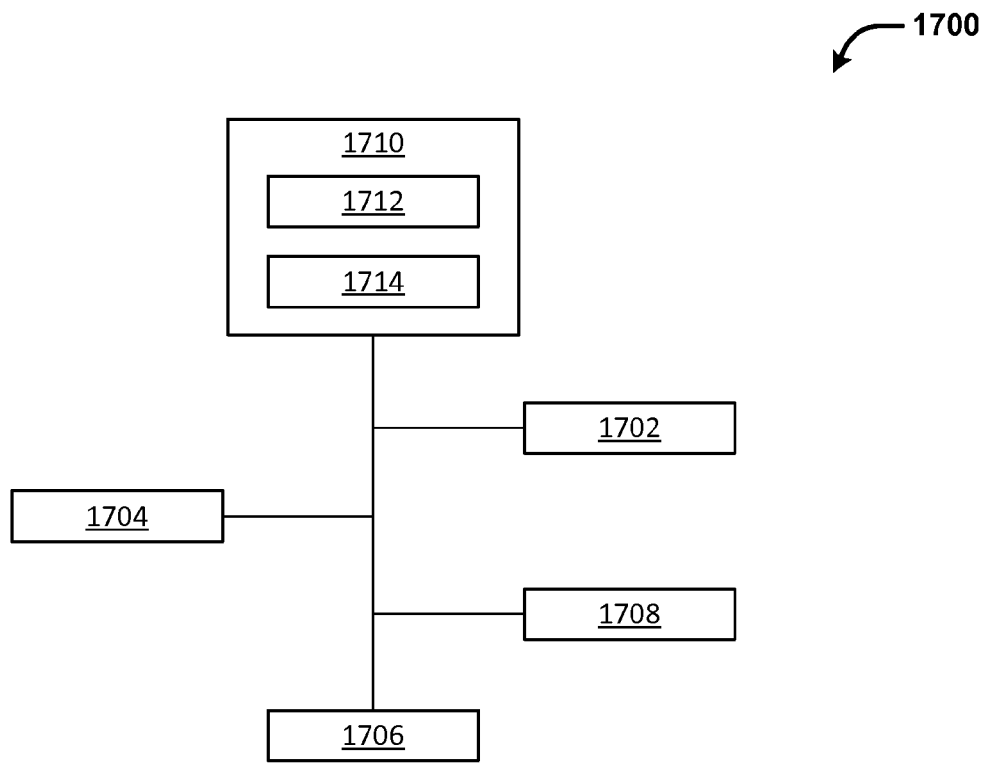
FIG. 17 illustrates an exemplary system for controlling a movable object, in accordance with embodiments.

FIG. 17 illustrates an exemplary system 1700 for controlling a movable object, in accordance with embodiments. The system 1700 can be used to control a movable object such as a UAV. The system 1700 can be used in combination with any suitable embodiment of the systems, devices, and methods disclosed herein. For example, the system 1700 may be implemented by a control terminal such as described herein. The system 1700 can include an input module 1702, a processing unit 1704, a non-transitory computer readable medium 1706, a display module 1708, and a communication module 1710, all interconnected via a bus or a similar network.

The input module 1702 can include one or more input mechanisms for receiving input from a user operating the input module. Such input mechanisms can include one or more joysticks, switches, knobs, slide switches, buttons, dials, touchscreens, keypads, keyboard, mouse, voice controls, gesture controls, inertial sensors, and the like. Such input module 1702 can be used to receive user input used to control aspects of the movable object, carrier, payload, or a component thereof. Such aspects may include attitude, position, orientation, navigation, tracking, and the like. For example, the input mechanisms can be manually set by a user to one or more positions, each of the positions corresponding to a predetermined input for controlling the UAV.

In some embodiments, the input mechanisms can be manipulated by a user to input control commands for controlling the navigation of the movable object. For instance, the user may utilize a knob, switch, or a similar input mechanism to input a flight mode for the movable object such as auto pilot or navigation according to a predetermined navigation path. As another example, the user may control the position, attitude, orientation and other aspect of the movable object by the tilting the control terminal in certain ways, which may be detected by one or more inertial sensors and used to generate the corresponding navigation commands. As yet another example, the user may use the input mechanism to adjust an operational parameter (e.g., zoom) of the payload, an attitude and/or the payload (e.g., via the carrier), or other aspects of any object onboard the movable object.

In some embodiments, the input mechanisms can be manipulated by a user to input target information such as described herein. For instance, the user may utilize a knob, switch, or a similar input mechanism to select the appropriate tracking mode such as manual tracking mode or auto tracking mode. The user may also use the input mechanisms to select a particular target to track, specify target type information, and other similar information. In various embodiments, the input module may be implemented by more than one device. For example, the input module may be implemented by a standard remote controller with joystick(s) that is operatively coupled with a mobile device (e.g., smartphone) running suitable mobile application software ("app") that can generate control instructions for the movable object. The app may be configured to obtain inputs from a user.

The processing unit 1704 can have one or more processors, such as a programmable processor (e.g., a central processing unit (CPU) or a microcontroller). The processing unit 1704 can be operatively coupled to a memory 1706. The memory 1706 can include transitory and/or non-transitory storage media configured to store data, and/or logic, code, and/or program instructions executable by the processing unit 1704 for performing one or more routines or functions. The memory can include one or more memory units (e.g., removable media or external storage such as an SD card or random access memory (RAM)). In some embodiments, data from the input module 1702 can be directly conveyed to and stored within the memory units of the memory 1706. The memory units of the memory 1706 can store logic, code and/or program instructions executable by the processing unit 1704 to perform any suitable embodiment of the methods described herein. For example, the processing unit 1704 can be configured to execute instructions causing one or more processors of the processing unit 1704 to process and display sensing data (e.g., images) received from the movable object, generate control commands including navigation commands and target information based on user input, cause the communication module 1710 to transmit and/or receive data, and the like. The memory units can store sensing data or other data received from external devices (e.g., movable object). In some embodiments, the memory units of the memory 1706 can be used to store the processing results produced by the processing unit 1704. Although FIG. 17 depicts a single processing unit 1704 and a single memory 1706, one of skill in the art would appreciate that this is not intended to be limiting, and that the system 1700 can include a plurality of processing units and/or memory units of the memory.

In some embodiments, the display module 1708 can be configured to display information of the movable object, carrier, and/or payload with respect to position, translational velocity, translational acceleration, orientation, angular velocity, angular acceleration, or any suitable combinations thereof. The display module 1708 can be configured to display information received from the movable object and/or payload such as sensing data (e.g., images recorded by a camera or other image capturing device), tracking data such as described herein, control feedback data, and the like. In some embodiments, the display module 1708 may be implemented by the same device that implements the input module 1702. In other embodiments, the display module 1708 may be implemented by a device that is separate from (but that may be operatively coupled to) the device that implements the input module 1702.

The communication module 1710 can be configured to transmit and/or receive data from one or more remote devices (e.g., movable object, payload, base station, and the like). For example, the communication module 1710 can be configured to transmit control data (e.g., navigation commands, target information, and tracking control commands) to external systems or devices such as movable objects, carriers, and/or payloads. The communication module 1710 can also be configured to receive data (e.g., sensing data and tracking information) from such external systems or devices. In some embodiments, the communication module 1710 can include a transmitter 1712 and a receiver 1714 respectively configured to transmit and receive data to and from remote devices. In some embodiments, the communication module can include a transceiver that combines the functionalities of the transmitter and the receiver. In some embodiments, the transmitter and the receiver can communicate with each other as well as with the processing unit 1704. Any suitable means of communication can be used, such as wired communication or wireless communication described herein.

Figure 18:
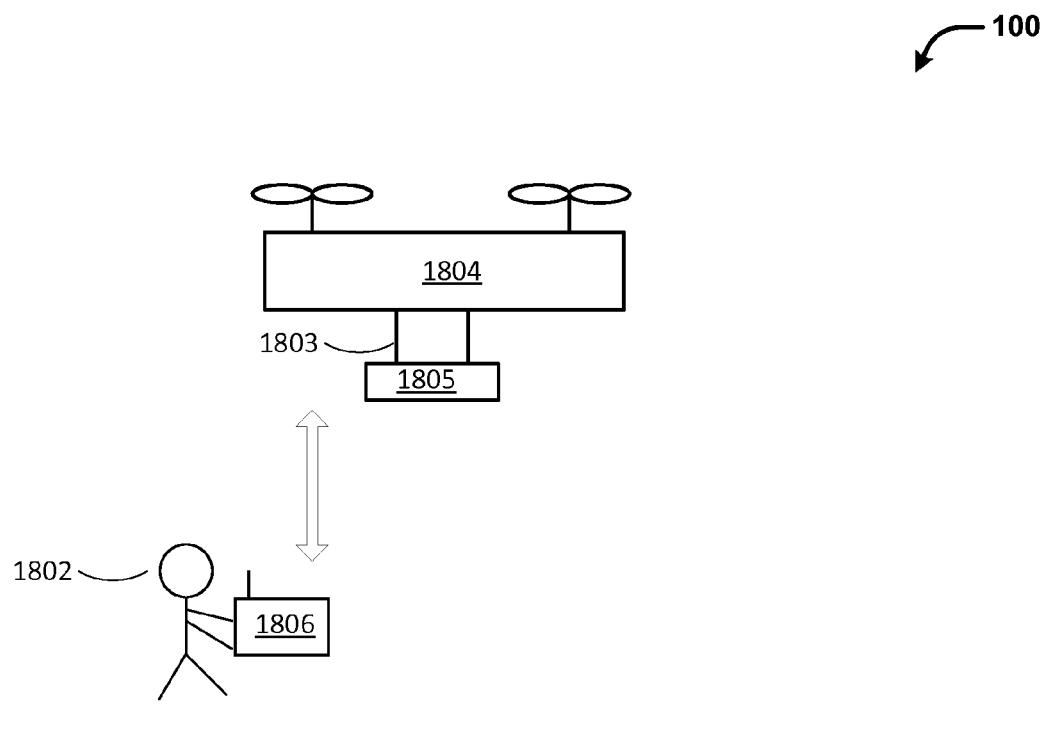
FIG. 18 illustrates an exemplary use case for the present invention.
Figure 18:
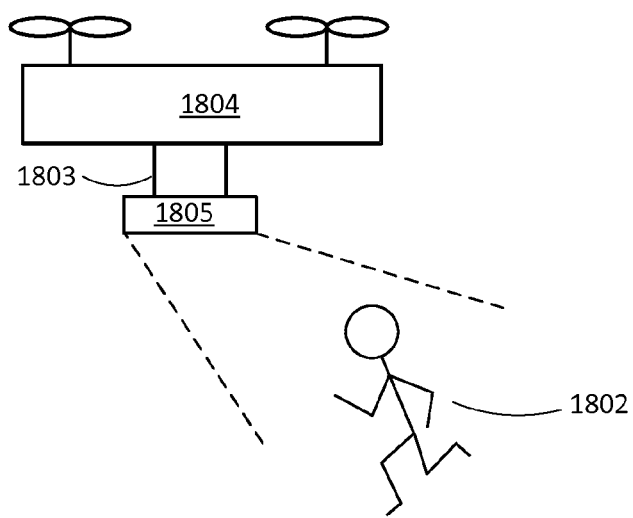

The tracking methods and systems as described herein can have a variety of applications. For example, FIG. 18 illustrates an exemplary use case for the present invention, where a user 1802 can configure a UAV 1804 to automatically track herself while she engages in a variety of activities. As illustrated in FIG. 18, the user can provide target information the UAV 1804 using a control terminal 1806. The control terminal 1806 can provide a user interface for receiving user input for generating input information, such as described herein. For example, the user interface may be configured to display one or more images (e.g., pictures or videos) as captured by an imaging device 1805 onboard the UAV or elsewhere. The imaging device 1805 may be coupled to the UAV via a carrier 1803 such as described herein. The images may have been transmitted in real time or substantial real time from the UAV to the control terminal. Alternatively, the images may be previously stored in the control terminal and/or provided or generated by other sources. Some of the images may show the user. The user may select herself from one of these images, for example, by touching or otherwise selecting an area of the display that corresponds to the user. In some cases, the user may specify target type information instead of selecting specific target information. Such target type information may be used to describe the type of targets that should be tracked such as "a person with red hat." The target information as specified by the user may be provided to the UAV. The transmission may occur via a wired or wireless connection. In various embodiments, the target information may be provided before or during the operation of the UAV. For example, the target information may be provided when the UAV is airborne or landed. In some embodiments, the user may also specify the start time, end time, and/or duration of the tracking. Such timing information may be used to control the timing of the tracking process.

The target information may be used by processor(s) onboard the UAV 1804 to automatically track the user 1802, for example, when the user is exercising (e.g., biking or running). The user may move about to stay substantially still while being tracked, while the image device 1805 onboard the UAV captures images of the user such that the resulting images maintains a predetermined size or position of the user. For example, the position, attitude, orientation, velocity, zoom, and/or other characteristics of the UAV 1804, carrier 1803, and/or imaging device 1805 may be adjusted in real time to keep track of the user. Such adjustment may be generated automatically by the processor(s) onboard the UAV and without user intervention. Alternatively or additionally, the tracking can be performed with some user intervention (e.g., adjustment of the zoom of the imaging device). The predetermined size or position of the user may be specified by the user or according to system default. In some embodiments, the user may wear or otherwise carry an object to facilitate the tracking of the user. Such an object may include, for example, bright colored cap or clothes.

In some embodiments, the images captured during tracking may be transmitted from the imaging device or UAV back to the control terminal or other suitable devices for display, playback, storage, edit, or other purposes. Such transmission may occur in real time or substantially real time as the images are captured by the imaging device. Alternatively, there may be a substantial delay between the capture and the transmission of the images. In some embodiments, the images are stored in a memory onboard the UAV without being transmitted anywhere. The user may view such images in real time and adjust the target information or other aspects of the UAV or a component thereof, if necessary. The adjusted target information may be provided to UAV as discussed above and the iterative process may continue until the desired images are obtained. In some embodiments, the images may be stored for later viewing or playback. In some embodiments, the images may be transmitted from UAV, imaging device and/or control terminal to some remote server. For example, the images may be shared on a social network platform such as Facebook or Twitter.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for controlling an unmanned aerial vehicle (UAV), comprising:
   one or more receivers, individually or collectively, configured to receive from a remote user (1) one or more navigation commands to move the UAV along a flight path, and (2) target information of a target to be tracked by an imaging device on the UAV; and
   one or more processors, individually or collectively, configured to track the target according to the target information by automatically adjusting at least one of the UAV or the imaging device while the UAV moves along the flight path according to the one or more navigation commands from the remote user, wherein the one or more processors, individually or collectively, make a determination to adjust 1) the UAV, 2) the imaging device, or 3) both the UAV and the imaging device, wherein said determination is dependent upon a) number of rotational axes of the imaging device and orientation of said rotational axes relative to the UAV; b) a navigation path of the UAV; or c) a maximum angular speed allowable for the UAV or the imaging device.

2. The system of claim 1, wherein the target information comprises initial target information comprising an initial position or an initial size of the target within an image captured by the imaging device.

3. The system of claim 1, wherein the target information comprises target type information comprising color, texture, or pattern information.

4. The system of claim 3, wherein tracking the target according to the target information further comprises identifying, based on the target type information, the target to track from within one or more images captured by the imaging device using an image recognition algorithm.

5. The system of claim 1, wherein the target information comprises expected target information comprising an expected position or an expected size of the target within an image captured by the imaging device.

6. The system of claim 1, wherein the UAV comprises a plurality of rotors configured to generate lift for the UAV.

7. The system of claim 1, wherein the imaging device is coupled to the UAV via a carrier configured to permit the imaging device to rotate around at least two axes relative to the UAV.

8. The system of claim 7, wherein the target information comprises expected target information and tracking the target according to the target information comprises:
- determining current target information of the target based on one or more images captured by the imaging device;
- detecting a deviation of the current target information from the expected target information; and
- calculating an adjustment to the UAV, the carrier, or the imaging device so as to substantially correct the deviation.

9. The system of claim 8, wherein the deviation is related to a change in position of the target and the calculated adjustment is related to an angular velocity for the imaging device relative to a yaw axis or a pitch axis of the imaging device.

10. The system of claim 9, wherein the calculated adjustment is used to generate control signals for the carrier so as to cause the imaging device to move relative to the UAV.

11. The system of claim 8, wherein the one or more processors are configured to provide a warning signal if the adjustment falls outside a predetermined range corresponding to a predetermined range of control lever amount of a control system comprising a navigation control system for the UAV or a control system for the carrier.

12. The system of claim 1, wherein said determination is dependent upon a maximum angular speed allowable for the UAV or the imaging device.

13. A method for controlling an unmanned aerial vehicle (UAV), comprising:
- receiving, from a remote user, user-specified target information of a target to be tracked by an imaging device on the UAV, the user-specified target information including a predetermined position or predetermined size of the target within an image captured by the imaging device, the imaging device coupled to the UAV via a carrier configured to permit the imaging device to move relative to the UAV;
- detecting, by one or more processors onboard the UAV, a deviation from the predetermined position or the predetermined size of the target based on one or more images captured by the imaging device; and
- automatically adjusting the UAV, the carrier, or the imaging device so as to substantially correct the detected deviation from the predetermined position or the predetermined size of the target, wherein the one or more processors, individually or collectively, make a determination to adjust 1) the UAV, 2) the imaging device, or 3) both the UAV and the imaging device, wherein said determination is dependent upon a) a navigation path of the UAV; or b) a maximum linear speed allowable for the UAV.

14. The method of claim 13, wherein said determination is dependent upon a maximum linear speed allowable for the UAV.

15. The method of claim 13, wherein the predetermined position of the target comprises an initial position or an expected position of the target and the predetermined size of the target comprises an initial size or an expected size of the target.

16. The method of claim 13, wherein detecting the deviation from the predetermined position or the predetermined size of the target comprises comparing a position or size of the target within the one or more images captured by the imaging device with the predetermined position or predetermined size, respectively.

17. The method of claim 13, wherein the adjustment involves adjusting a linear velocity of the UAV that is dependent upon the detected deviation from the predetermined size of the target within the image.

18. The method of claim 17, wherein the deviation is related to a change in size of the target and the adjustment is related to a linear velocity for the UAV or one or more parameters of the imaging device and wherein the one or more operational parameters of the imaging device comprise focal length, zoom level, imaging mode, image resolution, focus, depth of field, exposure, lens speed, or field of view.

19. The method of claim 13, wherein the UAV comprises a plurality of rotors configured to generate lift for the UAV.

20. The method of claim 13, further comprising providing a warning signal if the adjustment falls outside a predetermined range corresponding to a predetermined range of control lever amount of a control system comprising a navigation control system for the UAV or a control system for the carrier.

21. The method of claim 13, further comprising transmitting, in substantially real-time, images captured by the imaging device to a remote user device accessible to the remote user, the remote user device comprises a display for displaying the images captured by the imaging device and an input device for providing the target information comprising a touchscreen, joystick, keyboard, mouse, stylus, or a wearable device.

22. An apparatus for controlling an unmanned aerial vehicle (UAV), comprising:
- a display configured to display one or more images captured by an imaging device coupled to the UAV;
- an input device configured to receive a user selection of a target from within at least one of the one or more images being displayed on the display;
- one or more processors, individually or collectively, configured to generate target information of the target based at least in part on the user selection of the target; and
- a transmitter configured to provide the target information to the UAV so as to allow the UAV to autonomously track the target according to the target information, wherein the one or more processors, individually or collectively, make a determination to adjust 1) the UAV, 2) the imaging device, or 3) both the UAV and the imaging device, wherein said determination is dependent upon a) number of rotational axes of the imaging device and orientation of said rotational axes relative to the UAV; b) a navigation path of the UAV; or c) a maximum angular speed allowable for the UAV or the imaging device.

23. The apparatus of claim 22, wherein the target information comprises initial target information, target type information, and/or expected target information.

24. The apparatus of claim 22, wherein the user selection of the target is achieved by a user selecting an area of the at least one of the one or more images being displayed on the display, the selected area corresponding to the target.

25. The apparatus of claim 22, wherein the one or more processors, individually or collectively, are further configured to display, on the display, the selected target with a selection indicator in response to the user selection of the target, the selection indicator indicating that the target has been selected by the user.

26. A system for controlling an unmanned aerial vehicle (UAV), comprising:
- a receiver configured to receive, in substantially real-time, one or more images captured by an imaging device coupled to the UAV;
- an input device configured to receive user-specified target information of a target including a predetermined position or a predetermined size of a target within an image from the one or more images;

a transmitter for providing the user-specified target information to the UAV, and the user's input on allocation of control over a tracking process between the user and an onboard processing system of the UAV; and a display configured to display the one or more images and a tracking indicator associated with the target within the one or more images, the tracking indicator indicating that the target is being tracked by the UAV in substantially real-time according to the user-specified target information.

27. The system of claim of 26, wherein the system is configured to dynamically adjust the allocation of the control over the tracking process between the user and the UAV based upon a surrounding of the UAV, speed, altitude, computer resource available on board or off board the UAV.

28. The system of claim 26, wherein the imaging device is coupled to the UAV via a carrier configured to permit the imaging device to rotate relative to the UAV along at least one axis and wherein the input device is further configured to receive one or more commands adapted to control a speed, position, orientation or attitude of the UAV and/or the carrier.

29. The system of claim 28, wherein the target is tracked by the imaging device according to the target information via automatic adjustment to at least one of the UAV, the carrier, or the imaging device.

30. The system of claim 26, wherein the predetermined position comprises an initial or expected position of the target and the predetermined size comprises an initial or expected size of the target.

* * * * *